(12) United States Patent
Oka

(10) Patent No.: US 11,662,522 B2
(45) Date of Patent: May 30, 2023

(54) OPTICAL WAVEGUIDE DEVICE OPERATED AS MODE CONVERTER

(71) Applicant: Fujitsu Optical Components Limited, Kawasaki (JP)

(72) Inventor: Akira Oka, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 0 days.

(21) Appl. No.: 17/454,734

(22) Filed: Nov. 12, 2021

(65) Prior Publication Data

US 2022/0206224 A1  Jun. 30, 2022

(30) Foreign Application Priority Data

Dec. 25, 2020  (JP) .............................. JP2020-216281

(51) Int. Cl.
| | |
|---|---|
| G02B 6/27 | (2006.01) |
| G02B 6/122 | (2006.01) |
| G02B 6/14 | (2006.01) |
| G02B 6/126 | (2006.01) |
| G02B 6/12 | (2006.01) |

(52) U.S. Cl.
CPC ........... *G02B 6/2773* (2013.01); *G02B 6/126* (2013.01); *G02B 6/1228* (2013.01); *G02B 6/14* (2013.01); *G02B 6/2726* (2013.01); *G02B 2006/12097* (2013.01)

(58) Field of Classification Search
None
See application file for complete search history.

(56) References Cited

U.S. PATENT DOCUMENTS

| | | | |
|---|---|---|---|
| 9,977,187 B2 | 5/2018 | Shi | |
| 2015/0338577 A1* | 11/2015 | Shi | ............ G02B 6/125 385/11 |
| 2017/0017033 A1* | 1/2017 | Oka | ............ G02B 6/125 |
| 2018/0231713 A1 | 8/2018 | Picard | |

FOREIGN PATENT DOCUMENTS

| | | |
|---|---|---|
| JP | 5697778 B | 4/2015 |
| JP | 2015-197664 A | 11/2015 |

OTHER PUBLICATIONS

Daoxin Dai et al., "Novel concept for ultracompact polariation splitterrotator based on silicon nanowires," Optics express, vol. 19, No. 11, pp. 10940-10949 (2011) (10 pages).

* cited by examiner

*Primary Examiner* — Chad H Smith
(74) *Attorney, Agent, or Firm* — Staas & Halsey LLP

(57) ABSTRACT

An optical waveguide device includes first and second waveguides formed parallel to each other. The first waveguide includes a first rib and a first slab. The first slab is formed in a region between the first rib and the second waveguide. The second waveguide includes a second rib, a second slab and a third slab. The second rib is provided between the second slab and the third slab. The first and second slabs are integrally formed. At one end of the optical waveguide device, a first effective refractive index that indicates an effective refractive index of a TEi mode in the first waveguide is higher than a second effective refractive index that indicates an effective refractive index of a TEj mode in the second waveguide. At another end, the first effective refractive index is lower than the second effective refractive index.

9 Claims, 18 Drawing Sheets

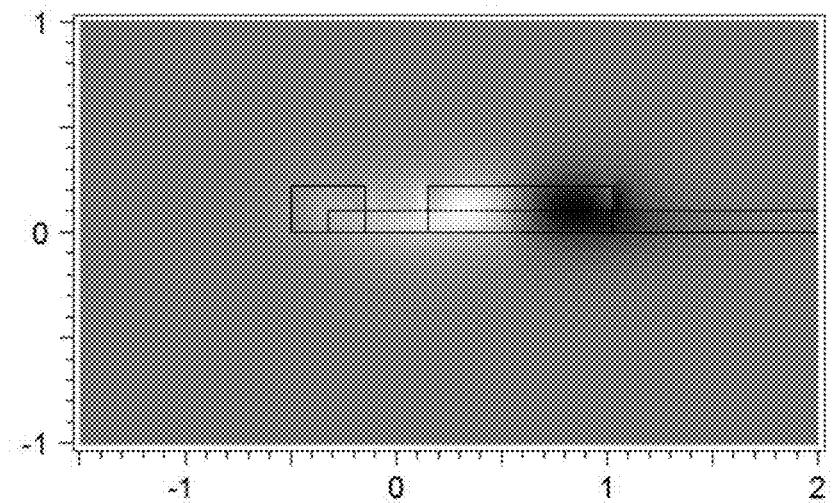
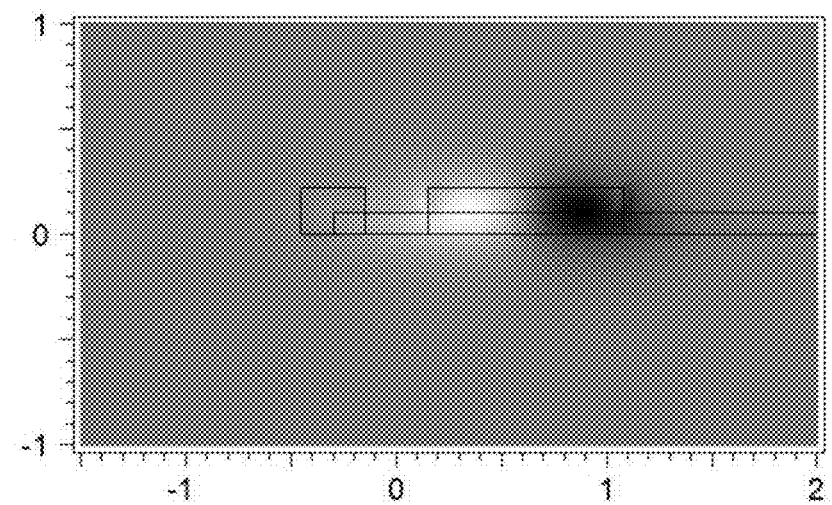
F I G. 10

OPTICAL WAVEGUIDE DEVICE OPERATED AS MODE CONVERTER

CROSS-REFERENCE TO RELATED APPLICATION

This application is based upon and claims the benefit of priority of the prior Japanese Patent Application No. 2020-216281, filed on Dec. 25, 2020, the entire contents of which are incorporated herein by reference.

FIELD

The embodiments discussed herein are related to an optical waveguide device operated as a mode converter.

BACKGROUND

In recent years, polarization multiplexing has been widespread to increase the capacity of optical communication systems. In polarization multiplexing, independent information is transmitted by using a pair of polarization components orthogonal to each other.

In the meantime, the development of optical integrated devices that can be downsized and/or highly densely integrated using silicon photonics techniques has been advanced. In a silicon photonics technique, an optical waveguide is formed in, for example, the surface region of a silicon-on-insulator (SOI) wafer. In this case, a core is formed from, for example, Si, and a cladding is formed from, for example, SiO2.

In this regard, the difference between the refractive index of Si and the refractive index of SiO2 is large, so light propagating through the optical waveguide is strongly confined in the core. Hence, the optical waveguide device can be downsized. However, when the difference in refractive index between a core and a cladding is large, there will be large polarization dependency pertaining to loss and confinement of an electric field in the core. Thus, an optical waveguide device is designed to optimize the characteristics of one of the polarization components. A polarization converter for converting the polarization component into the other polarization component is implemented in an optical circuit according to need. A polarization converter is described in, for example, non-patent document 1.

As depicted in FIG. 1, a polarization converter (e.g., the polarization separation rotator described in document 1) converts a TE0 mode into a TE1 mode and then converts the TE1 mode into the TM0 mode. Transverse magnetic (TM) mode is a waveguide mode wherein the main component of an electric field on a cross section perpendicular to a light traveling direction extends in a direction perpendicular to a substrate, and TM0 indicates the waveguide mode with the largest effective refractive index among the TM modes. Transverse electric (TE) mode is a waveguide mode wherein the main component of an electric field on a cross section perpendicular to a light traveling direction extends in a direction horizontal to a substrate, and TE0 and TE1 respectively indicate the waveguide mode with the largest effective refractive index (TE0) and the waveguide mode with the second largest effective refractive index (TE1) among the TE modes.

Document 1: Daoxin Dai et al. "Novel concept for ultra-compact polarization splitter-rotator based on silicon nanowires," Optics express, Vol. 19, No. 11, pp 10940 (2011)

Mode conversion between TE0 and TE1 is described in, for example, U.S. Pat. No. 9,977,187 and Japanese Patent No. 5697778. Relevant techniques are described in Japanese Laid-open Patent Publication No. 2015-197664 and U.S. Patent Publication No. 2018/0231713.

As depicted in FIG. 2, a mode converter (e.g., the optical waveguide device described in U.S. Pat. No. 9,977,187) includes two waveguides WG1 and WG2 formed close to each other and parallel to each other. When TE0-mode light is input through the input port of the waveguide WG1, TE1-mode light will be output through the output port of the waveguide WG2.

There needs to be an interaction between TE0 and TE1 in order to implement mode conversion in the configuration depicted in FIG. 2. The interaction occurs in a region in which the effective refractive index of TE0 in the waveguide WG1 is equal to the effective refractive index of TE1 in the waveguide WG2. The region in which the interaction occurs is preferably close to the midpoint between the input end and the output end of the optical waveguide device. In the example depicted in FIG. 2, the interaction preferably occurs in a region distant from the input port by L/2.

However, the effective refractive indexes of the waveguides WG1 and WG2 are dependent on the wavelength of light. Thus, in the prior art, a change in a wavelength may shift a position at which an interaction occurs, thereby increasing loss. Accordingly, in a case where a WDM signal including a plurality of wavelength channels is transmitted, some of the wavelength channels may have an increased loss in mode conversion.

SUMMARY

According to an aspect of the embodiments, an optical waveguide device includes a first waveguide and a second waveguide formed parallel to each other. The first waveguide includes a first rib and a first slab, the first slab being formed in a region between the first rib and the second waveguide. The second waveguide includes a second rib, a second slab and a third slab, the second rib being provided between the second slab and the third slab. The first slab and the second slab are integrally formed in a region between the first rib and the second rib. A shape of a cross section of at least one of the first rib and the second rib continuously changes in a region between an input end and an output end of the optical waveguide device. At one end of the optical waveguide device, a first effective refractive index that indicates an effective refractive index of a TEi mode in the first waveguide is different from a second effective refractive index that indicates an effective refractive index of a TEj mode in the second waveguide, where i and j are integers that are different from each other and larger than or equal to zero. When the first effective refractive index is higher than the second effective refractive index at the one end of the optical waveguide device, the first effective refractive index is lower than the second effective refractive index at another end of the optical waveguide device. When the first effective refractive index is lower than the second effective refractive index at the one end, the first effective refractive index is higher than the second effective refractive index at the other end.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 9 and 10 illustrate an example of calculation of electric field distributions in an optical waveguide device;

DESCRIPTION OF EMBODIMENTS

Figure 1:
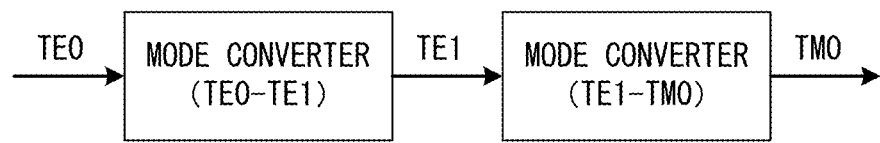
FIG. 1 illustrates an example of mode conversion between TE0 and TM0.
Figure 2:
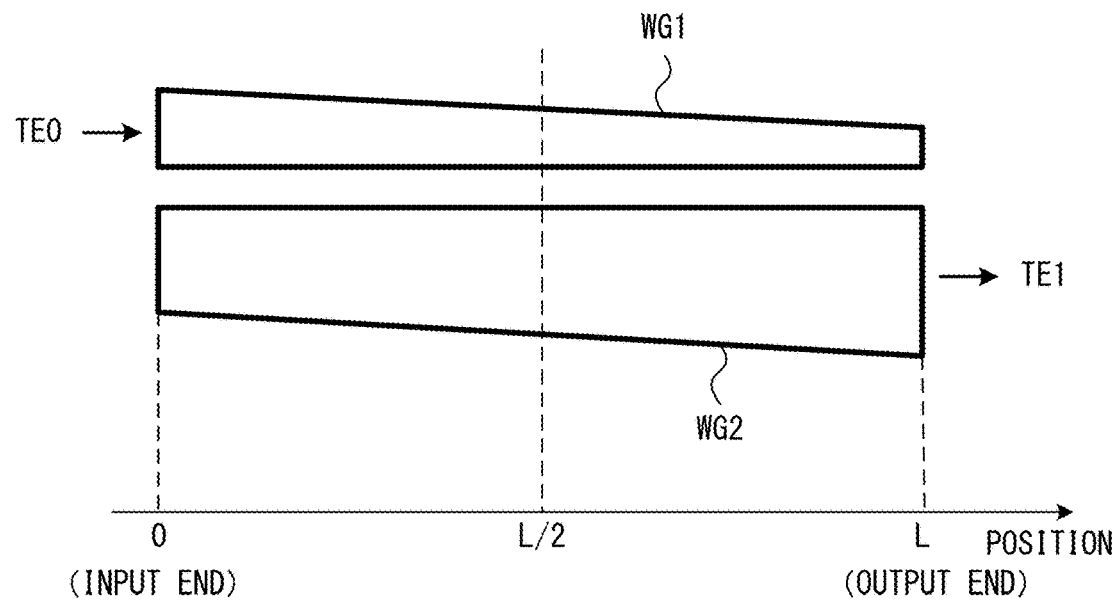
FIG. 2 illustrates an example of an optical waveguide device that includes a pair of waveguides.
Figure 3A:
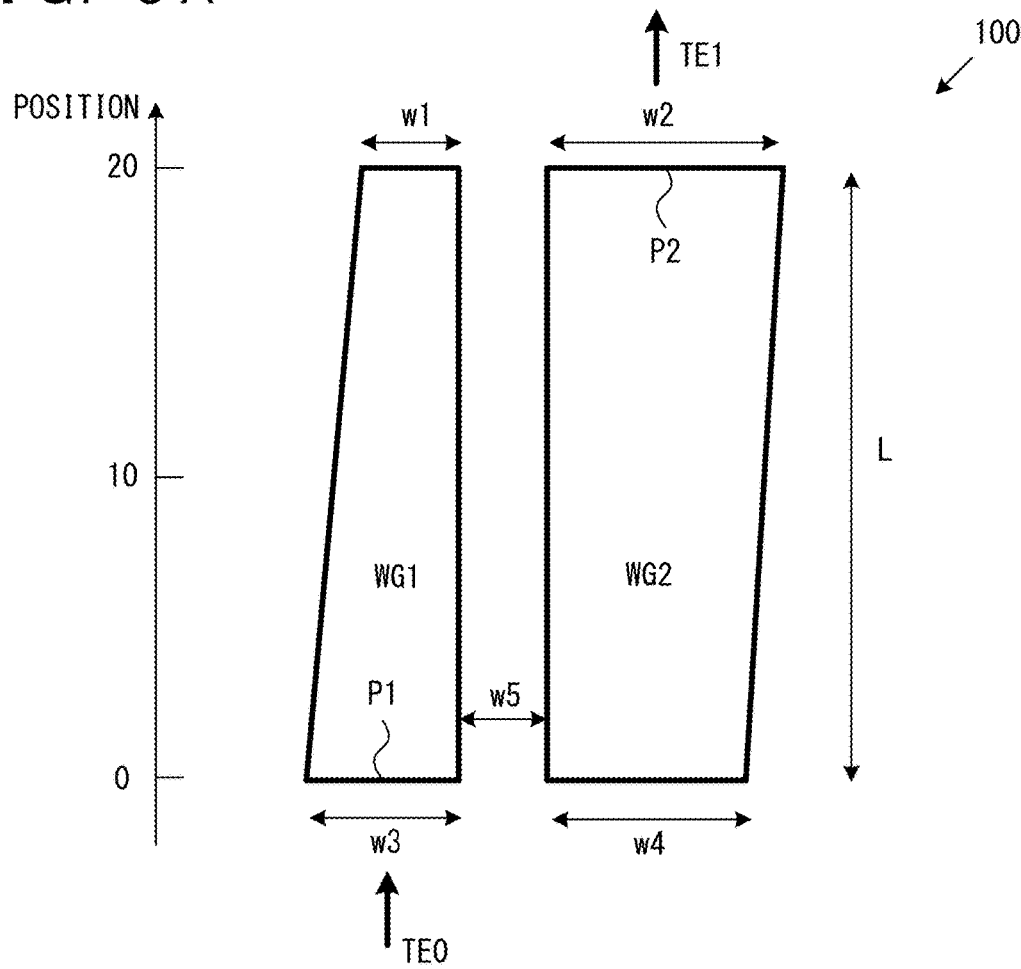
FIGS. 3A-3C illustrate an example of an optical waveguide device operated as a mode converter.
Figure 3B:
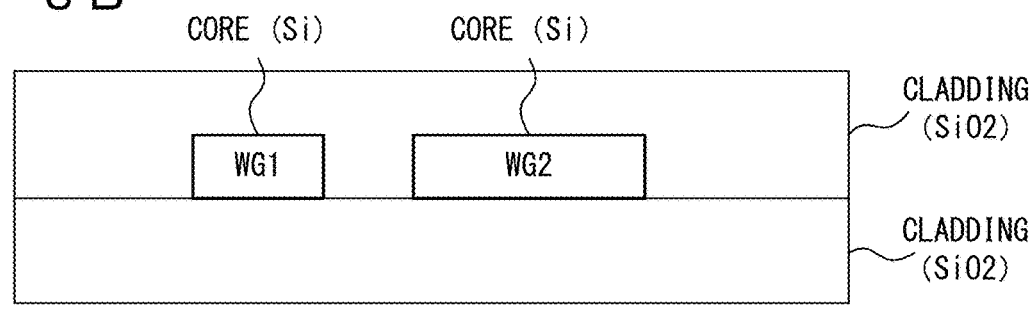
Figure 3C:
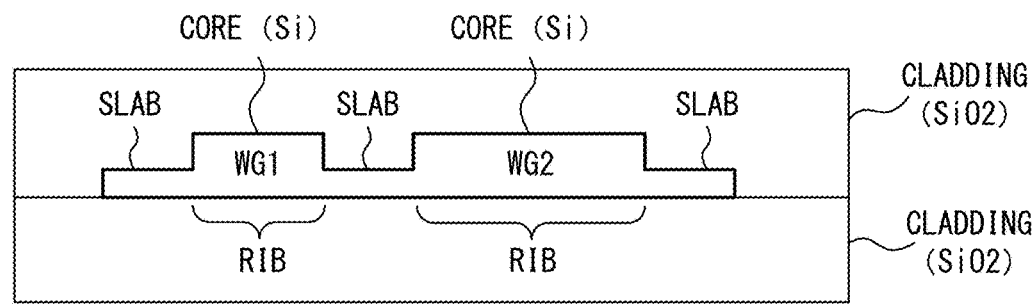

FIGS. 3A-3C illustrate an example of an optical waveguide device operated as a mode converter. An optical waveguide device 100 operated as a mode converter includes two waveguides WG1 and WG2 formed close to each other and parallel to each other. Each of the waveguides is formed from a core and cladding. The refractive index of the core is higher than that of the cladding. The core is formed from, for example, Si, and the cladding is formed from, for example, SiO2. Note that the core of a waveguide may hereinafter be referred to as a "waveguide." For example, WG1 and WG2 in FIG. 3A indicate the cores of the waveguides.

For example, as indicated in FIG. 3B, the waveguides WG1 and WG2 may be formed from channel waveguides. In this example, the core of the channel waveguide has a cross section shaped like a rectangle. That is, each of the waveguides WG1 and WG2 depicted in FIG. 3B is a rectangular waveguide. The cores are surrounded by the cladding. A "rectangle" may be a shape that can be deemed as a rectangle from a macroscopic viewpoint. Thus, a "rectangle" may be, for example, a trapezoid or a shape having a rounded corner due to a manufacturing process.

In the optical waveguide device 100, when performing mode conversion from TE0 to TE1, TE0-mode light is input to one end of the waveguide WG1 (port P1). The TE0-mode light propagates through the waveguide WG1. In this regard, the optical waveguide device 100 is designed such that there is an interaction between the TE0 mode in the waveguide WG1 and the TE1 mode in the waveguide WG2. Thus, TE1-mode light is output through an end of the waveguide WG2 (through a port P2).

However, in the configuration depicted in FIG. 3B, the core of the waveguide WG1 and the core of the waveguide WG2 are spaced apart from each other by the cladding. Hence, the optical coupling between the waveguides WG1 and WG2 is weak, and the efficiency of conversion from TE0 to TE1 is not good. That is, there is a large loss in the mode conversion from TE0 to TE1.

This problem can be alleviated by forming each of the waveguides WG1 and WG2 from a rib waveguide, as depicted in FIG. 3C. The core of the rib waveguide is formed from a rib and a slab. In this example, as with the channel waveguide, the rib has a cross section shaped like a rectangle. The slab is formed from the same material as the rib and has a less height than the rib. In the example depicted in FIG. 3C, a slab of the waveguide WG1 and a slab of the waveguide WG2 are coupled to each other in the region between the waveguides WG1 and WG2. The electric fields of light propagating through the ribs of the rib waveguides leak into the slabs, so the optical coupling between the waveguides WG1 and WG2 is strong. As a result, the loss in the mode conversion from TE0 to TE1 is smaller than that in the configuration depicted in FIG. 3B.

As a general rule, when the effective refractive indexes of two modes generated in respective waveguides formed in parallel (in this example, the TE0 in the waveguide WG1 and the TE1 in the waveguide WG2) are close to each other, the interaction between these modes is strong, and conversion from the mode in one of the waveguides to the mode in the other (in this example, the conversion from the TE0 in the waveguide WG1 to the TE1 in the waveguide WG2) tends to occur. That is to say, when the phase velocities (light velocity/effective refractive index) of the two modes become closer to each other, the conditions for occurring interaction between the two modes are satisfied. Accordingly, in order to implement the mode conversion between TE0 and TE1 efficiently, the optical waveguide device 100 is designed so as to have a region in which the effective refractive index of TE0 in the waveguide WG1 is equal to or substantially equal to the effective refractive index of TE1 in the waveguide WG2.

An "effective refractive index" means a value for an isolated waveguide. For example, in a case where two waveguides WG1 and WG2 are formed in parallel, the effective refractive index of TE0 in the waveguide WG1 means the value of the effective refractive index of TE0 obtained when the waveguide WG1 is present alone. Thus, the effective refractive index of TE0 in the waveguide WG1 means the value of the effective refractive index of TE0 assuming that the waveguide WG2 is not present. The expression "the waveguide WG2 is not present" indicates that the region in which the core of the waveguide WG2 would be present is formed from the same material as the cladding.

The effective refractive index of a waveguide is dependent not only on the material for the waveguide and the mode of light propagating through the waveguide, but also on the shape or area of a cross section of the waveguide. In particular, when a waveguide has a large cross-sectional area, light will be strongly confined, and the influence of the materials refractive index for the core will be large, thereby increasing the effective refractive index. By contrast, when a waveguide has a small cross-sectional area, the effective refractive index will be low.

Meanwhile, the input/output end of the optical waveguide device 100 (i.e., the input/output ends of the waveguides WG1 and WG2) is connected to an optical circuit via an isolated waveguide (i.e., an external waveguide coupled to the optical waveguide device 100). Thus, it is not preferable that the waveguides WG1 and WG2 have an interaction at the input/output end of the optical waveguide device 100. Accordingly, at the input/output end of the optical waveguide device 100, the effective refractive index of TE0 in the waveguide WG1 needs to be largely different from the effective refractive index of TE1 in the waveguide WG2.

Figure 4A:
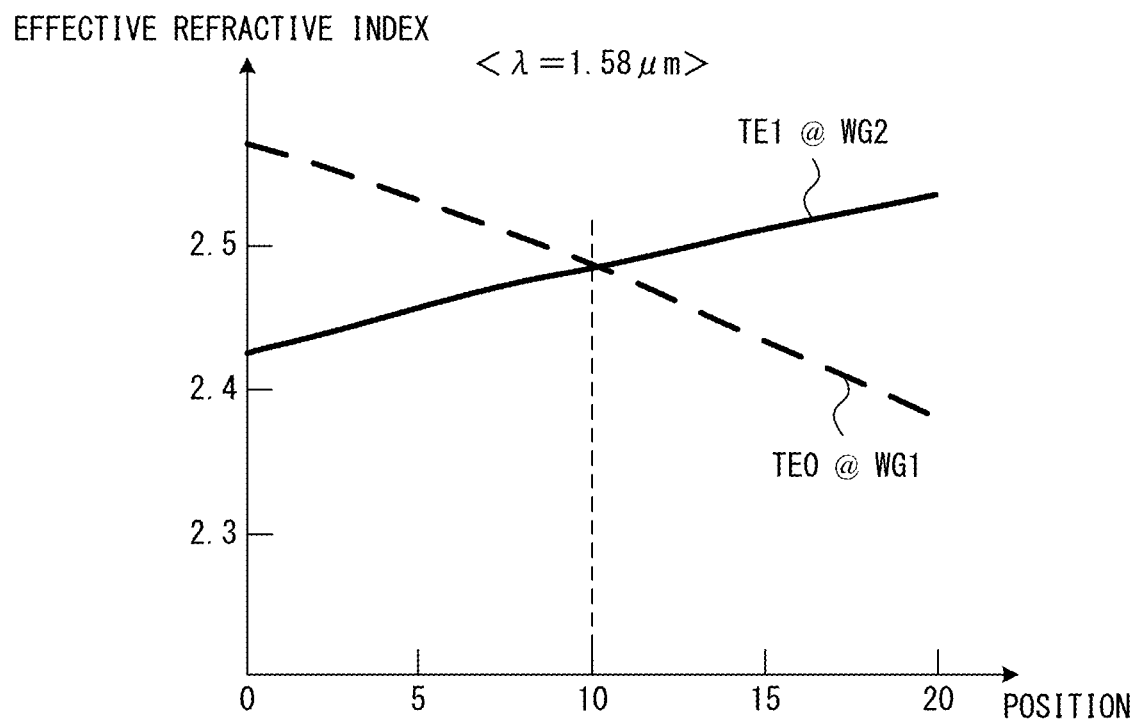
FIGS. 4A and 4B illustrate examples of changes in effective refractive indexes in an optical waveguide device depicted in FIGS. 3A-3C.
Figure 4B:
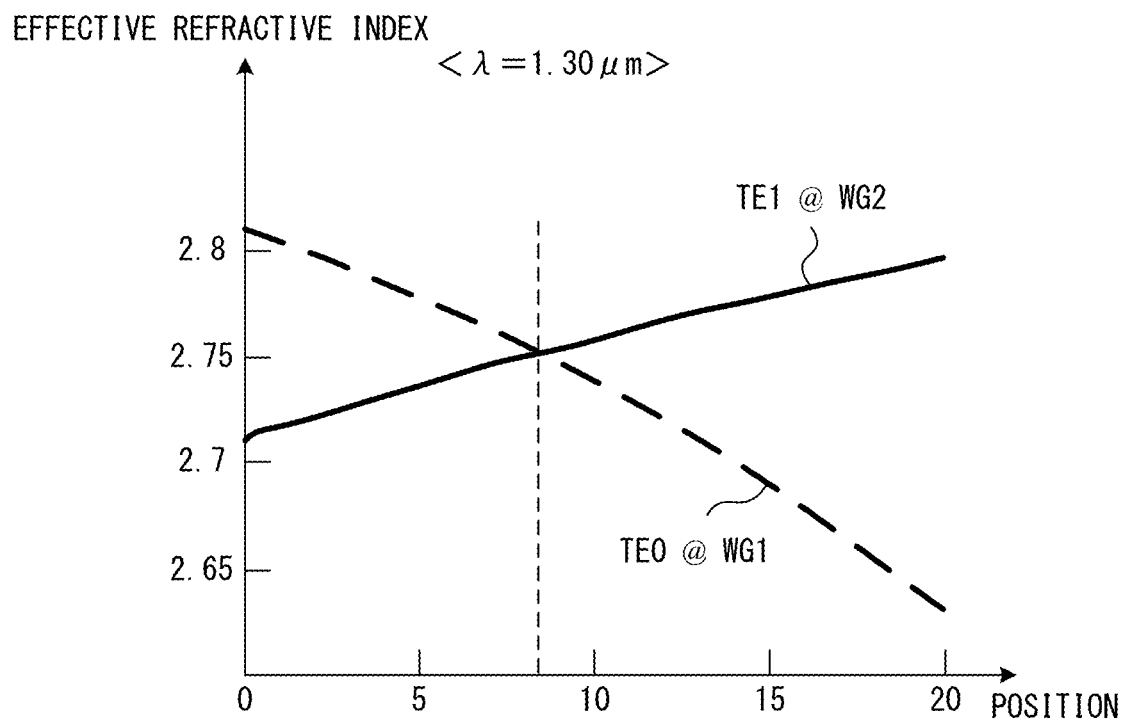

FIGS. 4A and 4B illustrate examples of changes in effective refractive indexes in the optical waveguide device 100 depicted in FIGS. 3A-3C. The graphs in FIGS. 4A and 4B indicate a result of a simulation performed in the configuration depicted in FIGS. 3A-3C under the condition below. The horizontal axis of each of the graphs indicates a position in the direction in which light propagates, with the input end of the optical waveguide device 100 defined as "zero." The vertical axis indicates an effective refractive index.

w1: 0.3 μm
w2: 1.08 μm
w3: 0.5 μm
w4: 0.88 μm
w5: 0.3 μm
Height of the cores at the ribs: 0.22 μm
Height of the cores at the slabs: 0.105 μm FIG. 4A depicts effective refractive indexes obtained when the wavelength of input light is 1.58 μm. In this example, at the input end, the effective refractive index of TE0 in the waveguide WG1 (TE0@WG1) is higher than the effective refractive index of TE1 in the waveguide WG2 (TE1@WG2). In this example, the width of the waveguide WG1 (more specifically, the rib of the waveguide WG1) gradually decreases in the direction from the input end toward the output end. That is, the cross-sectional area of the waveguide WG1 gradually decreases in the direction from the input end toward the output end. Hence, the effective refractive index of TE0 in the waveguide WG1 gradually decreases in the direction from the input end toward the output end. Meanwhile, the width of the waveguide WG2 (more specifically, the rib of the waveguide WG2) gradually increases in the direction from the input end toward the output end. That is, the cross-sectional area of the waveguide WG2 gradually increases in the direction from the input end toward the output end. Hence, the effective refractive index of TE1 in the waveguide WG2 gradually increases in the direction from the input end toward the output end.

The optical waveguide device 100 is designed such that the effective refractive index of TE0 in the waveguide WG1 is equal to the effective refractive index of TE0 in the waveguide WG1 at a point between the input end and the output end. A position at which the effective refractive index of TE0 in the waveguide WG1 and the effective refractive index of TE1 in the waveguide WG2 are equal may hereinafter be referred to as a "cross point."

The optical waveguide device 100 is designed such that the cross point is provided at the midpoint between the input end and the output end so as to decrease loss in the mode conversion from TE0 to TE1. For example, when the positions of the input end and the output end of the optical waveguide device 100 are, as depicted in FIG. 3A, respectively represented by "zero" and "20," the optical waveguide device 100 may be designed such that the cross point is provided at the "position=10," as depicted in FIG. 4A.

However, the effective refractive indexes of the waveguides are dependent on the wavelength of light. Hence, the position at which the cross point is provided will be shifted when the wavelength changes. Assume, for example, that when the wavelength is 1.58 μm, the cross point is provided at the midpoint between the input end and the output end, as depicted in FIG. 4A. In this case, when the wavelength is 1.30 μm, the cross point is, as depicted in FIG. 4B, provided at a position shifted from the midpoint toward on the input end.

When the position at which the cross point is provided is shifted from the midpoint between the input end and the output end, the loss in the mode conversion between TE0 and TE1 will increase. In this regard, the energy loss below will occur when TE0-mode light is input to the port P1 depicted in FIG. 3A and TE1-mode light is output through the port P2. Note that the optical waveguide device 100 has a length L of 120 μm.

Wavelength=1.58 μm: loss: 0.29 dB
Wavelength=1.30 μm: loss: 1.91 dB

Accordingly, when the wavelength of input light changes, the loss in the mode conversion also changes. Thus, designing the optical waveguide device such that a loss decreases for a certain wavelength will lead to an increase in a loss for another wavelength. Hence, in the configuration depicted in FIG. 3C, it is difficult to implement mode conversion with a small loss over a wide wavelength band.

In the configuration depicted in FIG. 3C, a slab is provided between the rib of the waveguide WG1 and the rib of the waveguide WG2 so as to strengthen the optical coupling between the waveguides WG1 and WG2, and the efficiency of the mode conversion from TE0 to TE1 is improved. However, in this configuration, slabs that do not contribute to the optical coupling between the waveguides WG1 and WG2 are also formed. An electric field will be leaked from the unnecessary slabs. In particular, when TE0-mode light is input to the waveguide WG1, the electric field of the TE0-mode light will be leaked into the slab formed outward of the waveguide WG1.

As a result, the optical coupling between the waveguides WG1 and WG2 will be weakened, thereby reducing the power of the TE1-mode light output through the port P2. In other words, the waveguides WG1 and WG2 need to have an extended length L so as to provide TE1-mode light having specified power. In this case, the optical waveguide device 100 will be large-sized.

Embodiments

Figure 5A:
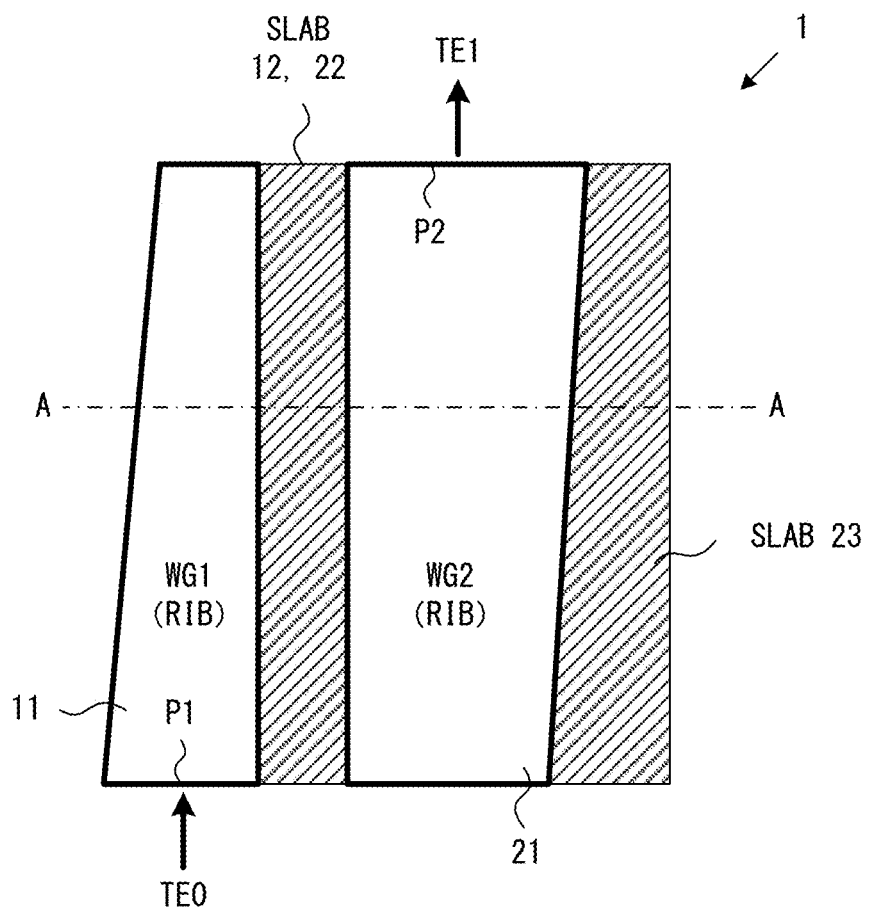
FIGS. 5A and 5B illustrate an example of an optical waveguide device in accordance with embodiments of the present invention.
Figure 5B:
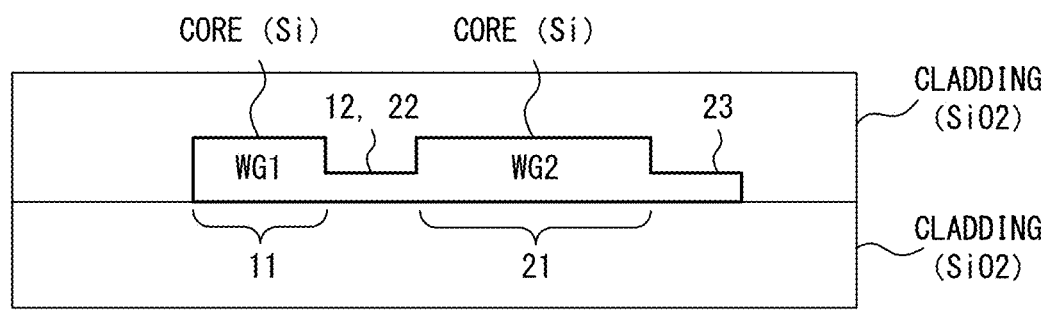

FIGS. 5A and 5B illustrate an example of an optical waveguide device in accordance with embodiments of the present invention. An optical waveguide device 1 in accordance with embodiments of the present invention may be operated as a mode converter. In this example, the optical waveguide device 1 performs the conversion between a TE0 mode and a TE1 mode. For example, the optical waveguide device 1 may be used in an optical circuit that performs the mode conversion between TE0 and TM0. In this case, the optical circuit includes the optical waveguide device 1 and a TE1-TM0 converter.

As depicted in FIG. 5A, the optical waveguide device 1 includes two waveguides WG1 and WG2 formed close to each other and parallel to each other. Each of the waveguides is formed from a core and cladding. The refractive index of the core is higher than that of the cladding. The core is formed from, for example, Si, and the cladding is formed from, for example, SiO2. Note that the core of a waveguide may hereinafter be referred to as a "waveguide."

As depicted in FIG. 5B, each of the waveguides WG1 and WG2 is a rib waveguide. As described above, the rib waveguide includes a core formed from a rib and a slab. The waveguide WG1 includes a rib 11 and a slab 12. The waveguide WG2 includes a rib 21 and slabs 22 and 23. In this example, the ribs have a cross section shaped like a rectangle. The slabs are formed from the same material as the rib and have a less height than the rib. Note that FIG. 5B depicts an A-A cross section of the optical waveguide device 1 illustrated in FIG. 5A.

The waveguide WG2 includes slabs formed on both sides of the rib 21. In particular, the slab 22 is formed on the side of the rib 21 on which the waveguide WG1 is provided, and the slab 23 is formed on the side of the rib 21 on which the waveguide WG1 is not provided. By contrast, the waveguide WG1 includes a slab formed only on one side of the rib 11. In particular, the slab 12 is formed on the side of the rib 11 on which the waveguide WG2 is provided. Note that a waveguide that includes a slab on only one side of a rib may be referred to as a "semi-rib waveguide."

As described above, the optical waveguide device 1 includes the two waveguides WG1 and WG2 formed close to each other and parallel to each other. One of the waveguides (in this example, the waveguide WG1 to which TE0-mode light is input) is formed from a semi-rib waveguide, and the other waveguide (in this example, the waveguide WG2) is formed from a rib waveguide.

Specifically, the slabs 12 and 22 are formed in the region between the rib 11 of the waveguide WG1 and the rib 21 of the waveguide WG2. Although the slab 12 belongs to the waveguide WG1 and the slab 22 belongs to the waveguide WG2, the slab 12 and the slab 22 are not separated from each other but are integrally formed as one slab region. Accordingly, the slab formed in the region between the ribs 11 and 12 may hereinafter be referred to as a "slab 12_22." Meanwhile, the slab 23 is formed outward of the rib 21 of the waveguide WG2, but a slab is not formed outward of the rib 11 of the waveguide WG1.

The rib 11 of the waveguide WG1 has a tapered shape such that the width gradually decreases in the direction from the input end toward the output end. The rib 21 of the waveguide WG2 has a tapered shape such that the width gradually increases in the direction from the input end toward the output end.

The following describes design policies for the waveguides WG1 and WG2. As a general rule, under the same effective refractive index, higher-order modes exhibit a larger change in the amount of leakage of light from a core into a cladding with respect to a change in a wavelength. The more light is leaked from a core into a cladding, the more easily an effective refractive index is affected by the materials refractive index. In this regard, the materials refractive index for the cladding is lower than that for the core. Hence, the more light is leaked from the core into the cladding, the lower the effective refractive index is. Thus, higher-order modes exhibit a larger change in an effective refractive index when a wavelength changes.

In the example depicted in FIGS. 4A and 4B, when the wavelength changes from 1.58 μm to 1.30 μm, at the position zero, the effective refractive index of TE0 in the waveguide WG1 exhibits a change of about 0.24. By contrast, the effective refractive index of TE1 in the waveguide WG2 exhibits a change of about 0.29. Thus, higher-order modes exhibit a larger change in an effective refractive index with respect to a change in a wavelength.

Accordingly, even when the optical waveguide device is designed, as described above, such that the cross point is provided at the midpoint between the input end and the output end, the position at which the cross point is provided will be shifted when the wavelength changes. In the example depicted in FIGS. 4A and 4B, when the wavelength is 1.58 μm, the cross point is provided at the midpoint, and when the wavelength is 1.30 μm, the cross point is shifted toward the input side with respect to the midpoint.

Meanwhile, the extent of a change in an effective refractive index with respect to a change in a wavelength is dependent on the structure of a waveguide. In particular, a waveguide implementing weak confinement of light (weak waveguide) exhibits, as a general rule, a small change in the effective refractive index of a mode generated in the waveguide with respect to a change in the wavelength. In this regard, a semi-rib waveguide includes a slab formed only on one side of a rib. A rib waveguide includes slabs formed on both sides of a rib. When light propagates through a waveguide, light is leaked from a slab to a cladding. In particular, in the case of a semi-rib waveguide, light is leaked from one slab, and in the case of a rib waveguide, light is leaked from two slabs. Thus, the rib waveguide implements weaker confinement of light than the semi-rib waveguide. Accordingly, the rib waveguide exhibits a smaller change in the effective refractive index with respect to a change in the wavelength than the semi-rib waveguide.

Thus, the following effects are attained.
(1) Higher-order modes exhibit a larger change in an effective refractive index with respect to a change in a wavelength.
(2) A rib waveguide exhibits a smaller change in an effective refractive index with respect to a change in a wavelength than a semi-rib waveguide.

Therefore, by combing these two effects, a change in an effective refractive index with respect to a wavelength change can be canceled or alleviated. In particular, a waveguide through which high-order mode light propagates is formed from a rib waveguide. A waveguide through which low-order mode light propagates is formed from a semi-rib waveguide.

Accordingly, in the optical waveguide device 1 depicted in FIGS. 5A and 5B, the waveguide WG1 through which low-order mode (TE0) light propagates is formed from a semi-rib waveguide. The waveguide WG2 through which high-order mode (TE1) light propagates is formed from a rib waveguide. As a result, a change that is made in the difference in effective refractive index between the low-order mode and the high-order mode when the wavelength changes can be decreased, so that the effective refractive indexes can be equalized by slightly changing the width of the waveguides. Thus, the amount of shift of the position at which the cross point is provided is decreased with respect to a change in the wavelength. Accordingly, the mode conversion between TE0 and TE1 can be performed over a wide wavelength band in the vicinity of the midpoint between the input end and the output end of the optical waveguide device 1. Therefore, mode conversion with a small loss is implemented over a wide wavelength band.

Figure 6A:
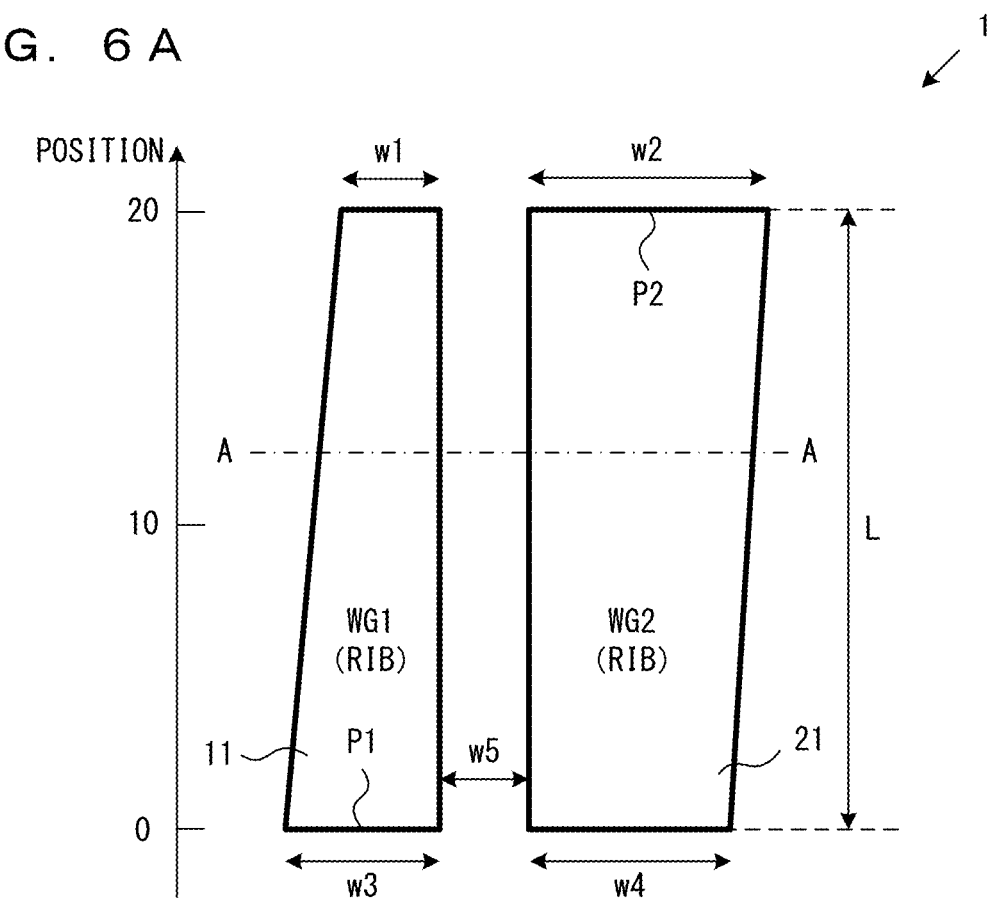
FIGS. 6A and 6B illustrate an example of the sizes of waveguides.
Figure 6B:
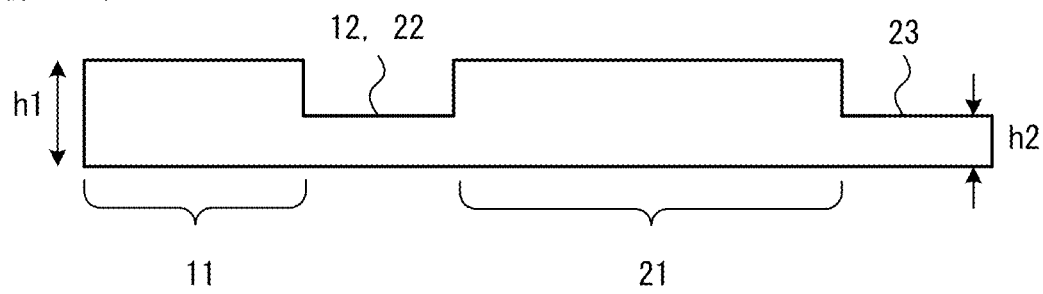
Figure 7A:
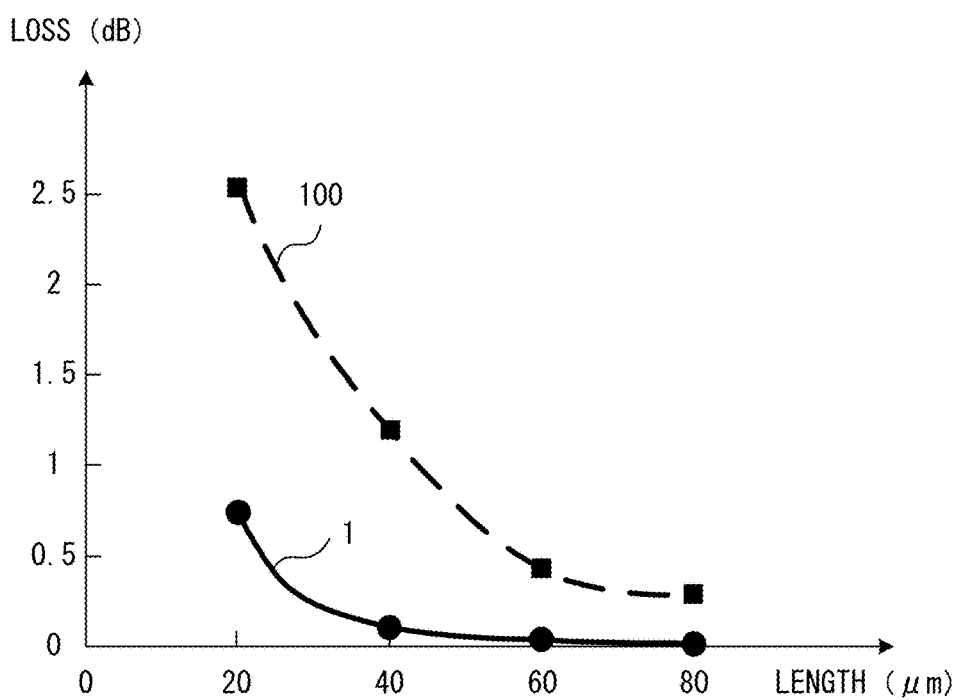
FIGS. 7A and 7B illustrate a simulation result for energy loss in mode conversion.
Figure 7B:
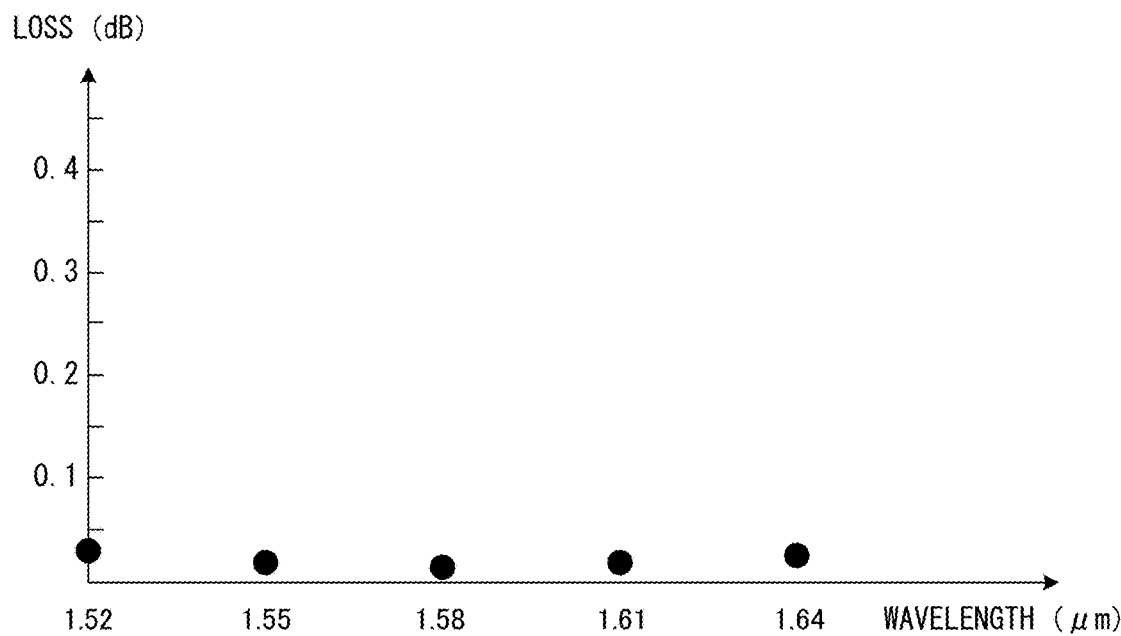

FIGS. 6A and 6B illustrate an example of the sizes of waveguides. In this example, the optical waveguide device 1 is sized as follows.

w1: 0.3 μm
w2: 0.93 μm
w3: 0.5 μm
w4: 0.73 μm
w5: 0.3 μm
h1 (height of the cores of ribs 11 and 21): 0.22 μm
h2 (height of the cores of slabs 12_22, and 23): 0.105 μm FIGS. 7A and 7B illustrate a simulation result for energy loss in mode conversion. The graphs in FIGS. 7A and 7B indicate a result of a simulation for the mode conversion from TE0 to TE1 in the optical waveguide device 1 depicted in FIGS. 6A and 6B. TE0-mode light is input to the port P1 of the waveguide WG1. TE1-mode light is output through the port P2 of the waveguide WG2.

The horizontal axis in FIG. 7A indicates the lengths of the waveguides WG1 and WG2. The vertical axis indicates energy loss in the mode conversion from TE0 to TE1. The dashed-line graph indicates a loss in the optical waveguide device 100 depicted in FIGS. 3A and 3B. The solid-line graph indicates a loss in the optical waveguide device 1 in accordance with embodiments of the present invention. The wavelength of the input light is 1.52 μm.

As indicated in FIG. 7A, energy loss is significantly reduced in the embodiments of the present invention in comparison with the configuration depicted in FIG. 3C. For example, the optical waveguide device 100 may have a loss of about 0.29 dB when the waveguides WG1 and WG2 have a length of 80 μm. Meanwhile, the optical waveguide device 1 has a loss of about 0.12 dB even when the waveguides WG1 and WG2 have a length of 40 μm. Hence, the embodiments of the present invention allow the length of the waveguides WG1 and WG2 to be decreased when designing the optical waveguide device such that the loss is smaller than a specified value. Accordingly, the optical waveguide device can be downsized.

The reason that loss can be decreased in the embodiments of the present invention is considered to be the following: As depicted in FIGS. 5A and 5B, the optical waveguide device 1 does not include a slab region formed outward of the rib of the waveguide WG1. Thus, in comparison with the configuration depicted in FIG. 3C, the optical waveguide device 1 has reduced leakage of TE0-mode light in the waveguide WG1 from the core into the cladding. As a result, electric field components contributing to the optical coupling between the waveguides WG1 and WG2 are increased, and the interaction between TE0 and TE1 is enhanced, thereby decreasing the loss in mode conversion.

FIG. 7B indicates wavelength dependence of loss. The horizontal axis indicates the wavelength of input light. Note that the loss is calculated in accordance with FDTD. The waveguides WG1 and WG2 have a length of 120 μm.

According to the simulation, the loss is decreased to 0.05 dB or less over a wide wavelength range including the C band and the L band. Although not particularly illustrated, the loss is about 0.33 dB in the 1.30-nm band.

Figure 8A:
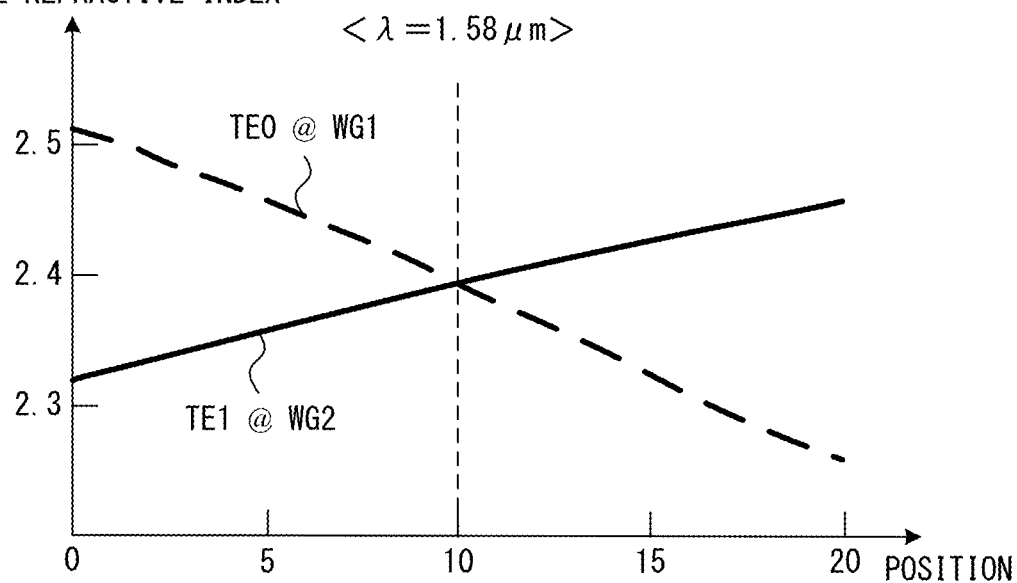
FIGS. 8A and 8B illustrate examples of changes in effective refractive indexes in an optical waveguide device depicted in FIGS. 5A, 5B, 6A, and 6B.
Figure 8B:
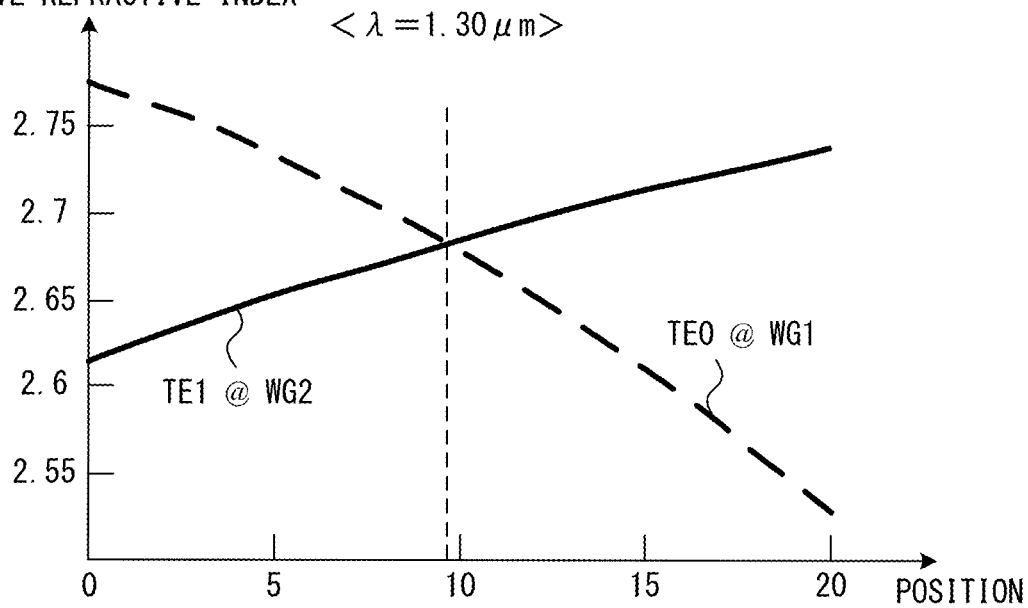

FIGS. 8A and 8B illustrate examples of changes in effective refractive indexes in the optical waveguide device depicted in FIGS. 5A, 5B, 6A, and 6B. The horizontal axis of each of the graphs indicates a position in the direction in which light propagates, with the input end of the optical waveguide device 1 defined as "zero." The vertical axis indicates an effective refractive index.

FIG. 8A depicts changes in effective refractive indexes that occur when the wavelength of input light is 1.58 μm. At the input end of the optical waveguide device 1 (position=zero), the effective refractive index of TE0 in the waveguide WG1 (TE0@WG1) is higher than the effective refractive index of TE1 in the waveguide WG2 (TE1@WG2). In this example, the width of the waveguide WG1 (rib 11) gradually decreases in the direction from the input end toward the output end. That is, the cross-sectional area of the core of the waveguide WG1 gradually decreases in the direction from the input end toward the output end. Hence, the effective refractive index of TE0 in the waveguide WG1 gradually decreases in the direction from the input end toward the output end. Meanwhile, the width of the waveguide WG2 (rib 21) gradually increases in the direction from the input end toward the output end. That is, the cross-sectional area of the core of the waveguide WG2 gradually increases in the direction from the input end toward the output end. Hence, the effective refractive index of TE1 in the waveguide WG2 gradually increases in the direction from the input end toward the output end. At the output end (position=20), the effective refractive index of TE0 in the waveguide WG1 (TE0@WG1) is lower than the effective refractive index of TE1 in the waveguide WG2 (TE1@WG2). As a result, the cross point is provided between the input end and the output end. In this example, the cross point is provided at the midpoint between the input end and the output end (position=10).

FIG. 8B depicts changes in effective refractive indexes that occur when the wavelength of input light is 1.30 μm. In this case, the cross point is also provided between the input end and the output end. However, unlike in the case indicated in FIGS. 4A and 4B, the cross point is provided substantially at the midpoint in the optical waveguide device 1 even when the wavelength is 1.30 μm. In particular, when the wavelength of input light changes from 1.58 μm to 1.30 μm, the amount of shift of the position of the cross point corresponds to about 1.6 percent of the length L of the optical waveguide device 1.

As described above, in the embodiments of the present invention, the shift of the position at which the cross point is provided is small with respect to a change in the wavelength. In this regard, the interaction between TE0 and TE1 occurs mainly in the vicinity of the cross point. Thus, in the embodiments of the present invention, even when the wavelength changes, the mode conversion between TE0 and TE1 is stably implemented with a small loss. Accordingly, the mode conversion between TE0 and TE1 is stably implemented with a small loss over a wide wavelength range.

In the examples described above, at the input end of the optical waveguide device 1, TE0@WG1 is higher than TE1@WG2, and at the output end of the optical waveguide device 1, TE0@WG1 is lower than TE1@WG2. However, the present invention is not limited to this configuration. In particular, the optical waveguide device 1 may be configured such that at the input end, TE0@WG1 is lower than TE1@WG2, and at the output end of the optical waveguide device 1, TE0@WG1 is higher than TE1@WG2. In other words, the quantitative relation between TE0@WG1 and TE1@WG2 at the input end may be opposite to the quantitative relation between TE0@WG1 and TE1@WG2 at the output end.

Figure 9:
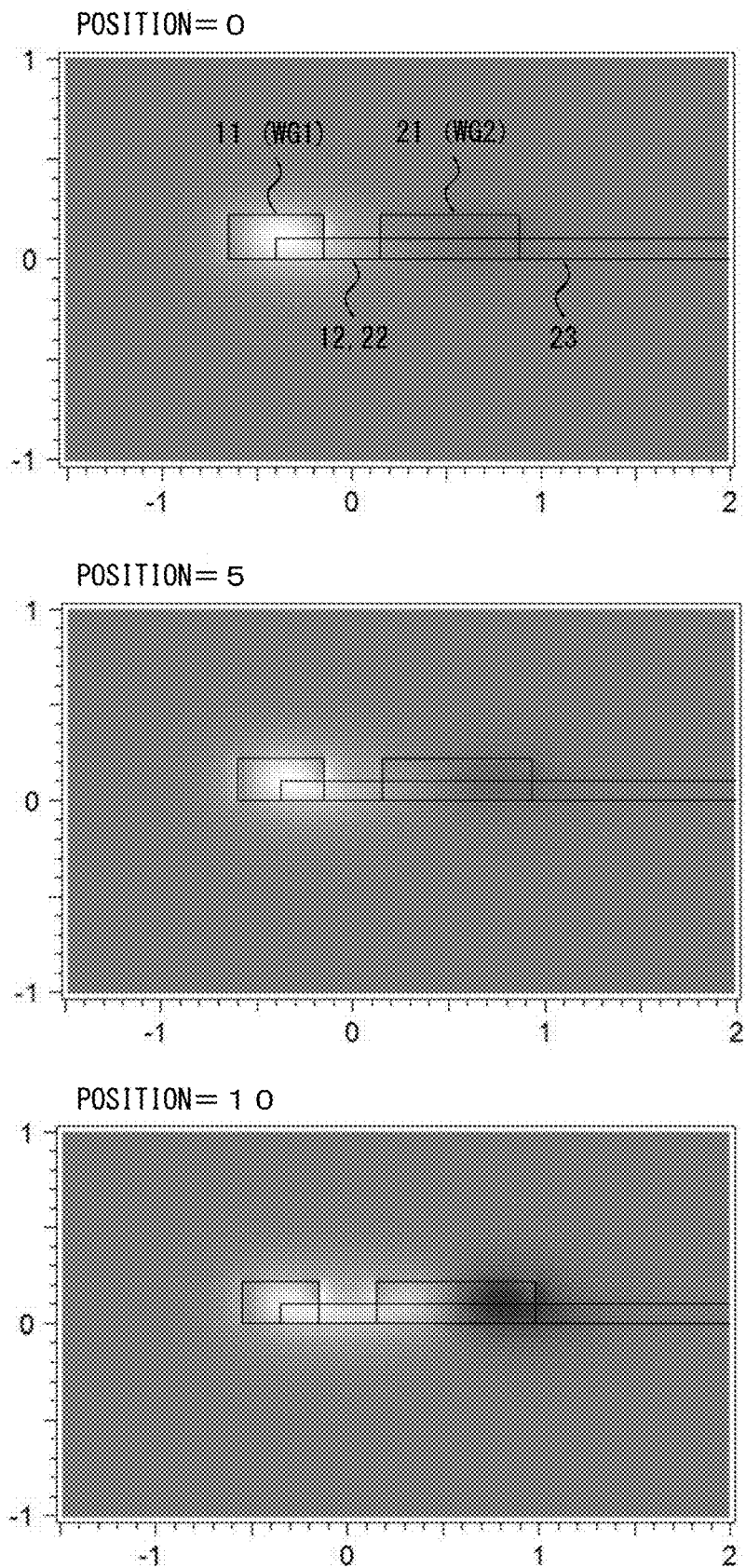

FIGS. 9 and 10 illustrate an example of calculation of electric field distributions in the optical waveguide device 1. In FIGS. 9-10, the X axes indicate positions in a direction parallel to the substrate and orthogonal to the light traveling direction. The Y axes indicate positions in a direction perpendicular to the substrate. The positive electric field becomes stronger as the whiteness level increases, and the negative electric field becomes stronger as the blackness level increases.

In this example, TE0-mode light is input to the waveguide WG1. Hence, at the input end (position=0), the electric field of the TE0 mode is localized in the waveguide WG1. At position=10, the electric field of the TE0 mode is present in the waveguide WG1, and the electric field of the TE1 mode emerges in the waveguide WG2. Thus, the interaction between TE0 and TE1 occurs in a region in the vicinity of position=10. At the output end (position=20), the electric field of the TE1 mode is localized in the waveguide WG2. That is, the optical waveguide device 1 converts TE0-mode light into TE1-mode light.

Figure 11A:
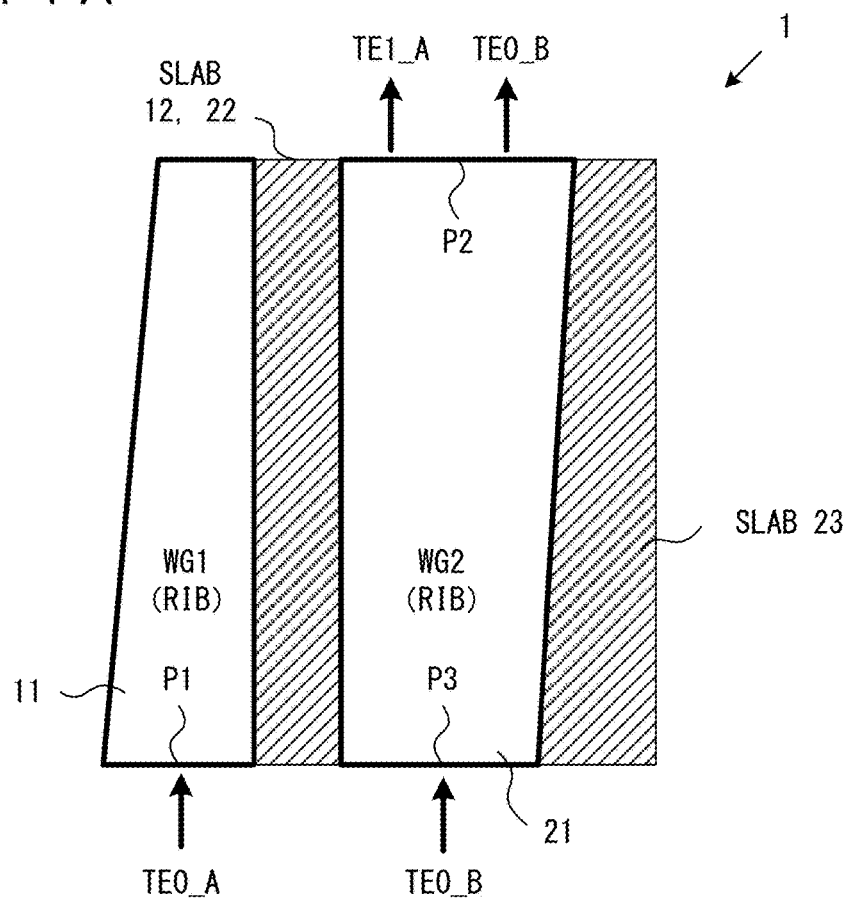
FIGS. 11A and 11B illustrate an example of multiplexing of TE0 and TE1.
Figure 11B:
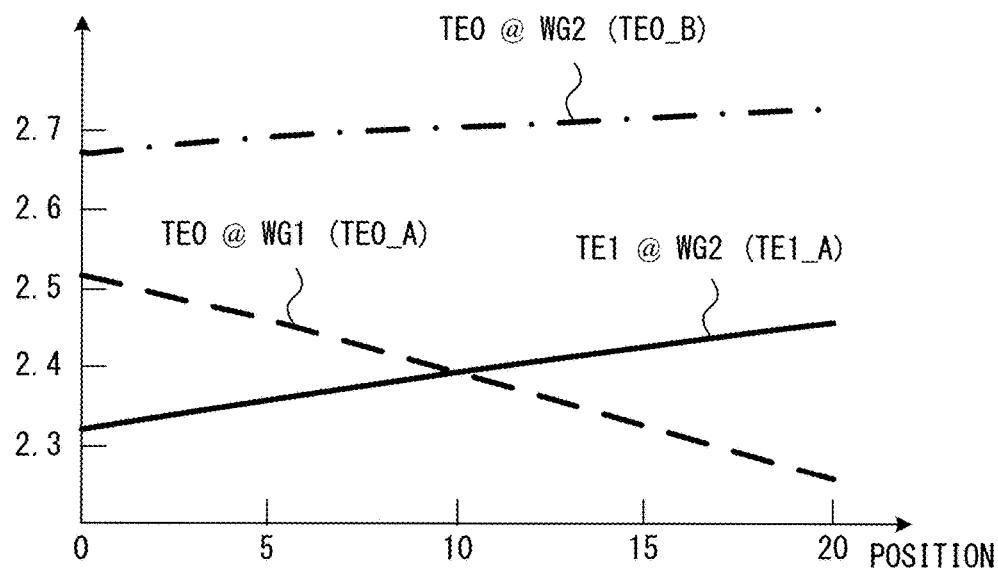

FIGS. 11A and 11B illustrate an example of multiplexing of TE0 and TE1. In this example, as depicted in FIG. 11A, TE0-mode light (TE0_A) is input to the port P1 of the waveguide WG1, and TE0-mode light (TE0_B) is input to the port P3 of the waveguide WG2.

FIG. 11B indicates the effective refractive indexes of TE0 and TE1. In this example, the wavelength of input light is 1.58 μm. TE0@WG1 indicates the effective refractive index of TE0 in the waveguide WG1, and TE1@WG2 indicates the effective refractive index of TE1 in the waveguide WG2. TE0@WG1 and TE1@WG2 are the same as those in the graph depicted in FIG. 8A.

TE0@WG2 indicates the effective refractive index of TE0 in the waveguide WG2. In this example, the core of the waveguide WG2 has a larger cross-sectional area than the core of the waveguide WG1. Hence, the effective refractive index of TE0 in the waveguide WG2 is higher than the effective refractive index of TE0 in the waveguide WG1. Higher-order modes have, as a general rule, a lower effective refractive index, so the effective refractive index of TE0 in the waveguide WG2 is higher than the effective refractive index of TE1 in the waveguide WG2. Accordingly, over the entirety of the region extending from the input end to the output end, the effective refractive index of TE0 in the waveguide WG2 is higher than the effective refractive index of TE0 in the waveguide WG1 and the effective refractive index of TE1 in the waveguide WG2.

As described above, the effective refractive index of TE0 in the waveguide WG2 is not equal to any of the effective refractive indexes of the other waveguide modes. Hence, an interaction does not occur between the TE0 in the waveguide WG2 and another mode. Thus, the TE0-mode light input to the port P3 (TE0_B), without being converted to another mode, propagates through the waveguide WG2 and is guided to the port P2. The TE0-mode light input to the port P1 (TE0_A) is converted into TE1-mode light (TE1_A) and is guided to the port P2. As a result, multiplexing of TE0 and TE1 is attained.

Figure 12:
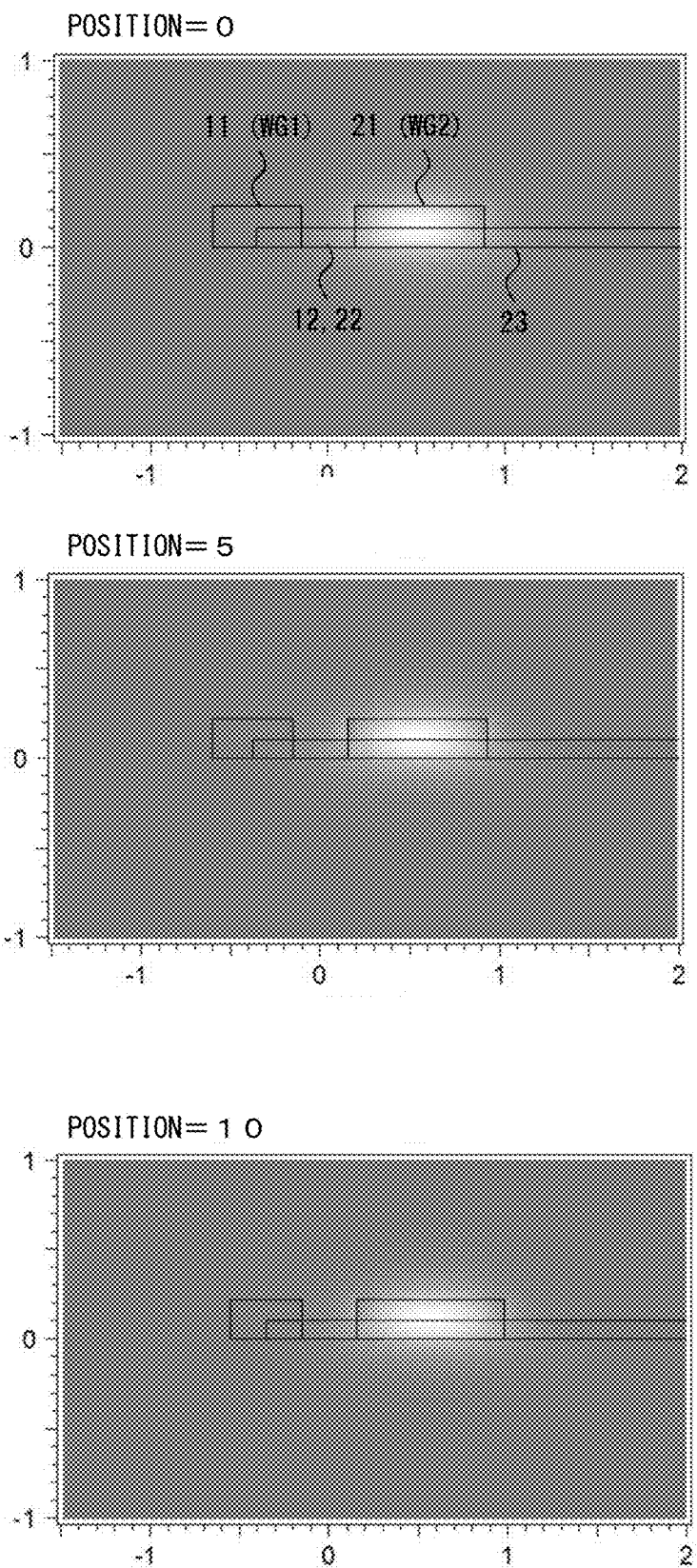
FIGS. 12 and 13 illustrate an example of calculation of electric field distributions attained when TE0-mode light is input through another input port.
Figure 13:
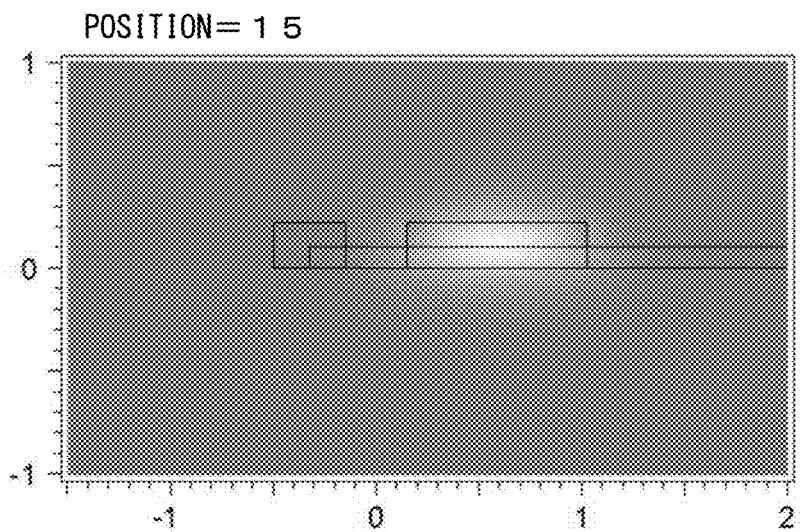
Figure 13:
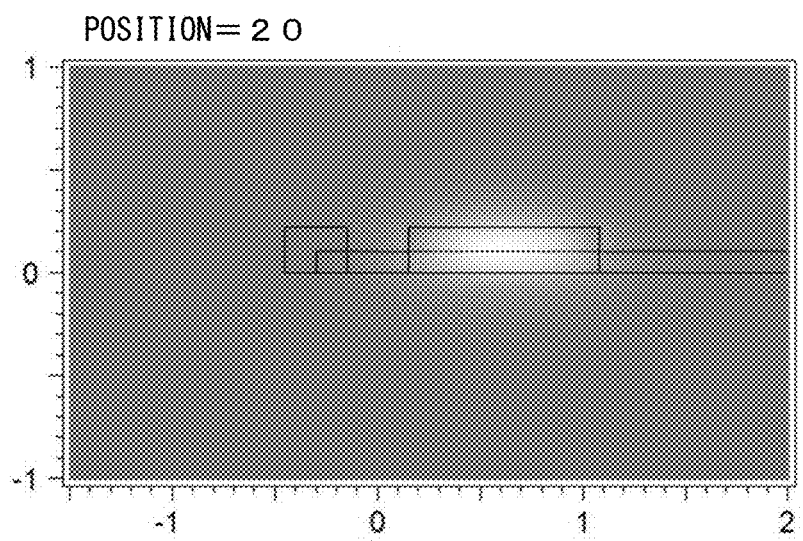

FIGS. 12-13 illustrate an example of calculation of electric field distributions attained when TE0-mode light is input to the port P3 of the waveguide WG2. In this case, the electric field of the TE0 mode is localized in the waveguide WG2 over the entirety of the region extending from the input end (position=0) to the output end (position=20). That is, the TE0-mode light input to the port P3 is output through the port P2 without being converted to another mode.

While the mode conversion from TE0 to TE1 is performed in the examples depicted in FIGS. 5A-10, the optical waveguide device 1 can perform an invertible operation. In particular, when TE1-mode light is input to the port P2 (i.e., the output end of the waveguide WG2), the mode conversion from TE1 to TE0 is performed, and TE0-mode light is output through the port P1 (the input end of the waveguide WG1).

In the examples described above, the mode conversion between TE0 and TE1 is performed. However, the present invention is not limited to this. In particular, the optical waveguide device 1 can perform conversion from an optional mode TEi to another optional mode TEj. Note that i and j are integers that are larger than or equal to zero and different from each other. As an example, j may be an integer that is larger than i. However, the waveguides WG1 and WG2 need to satisfy requirements pertaining to an adiabatic converter for two modes to be converted. In particular, the following requirements are preferably satisfied.

(1) At the input end, the effective refractive index of TEi in the waveguide WG1 is different from the effective refractive index of TEj in the waveguide WG2.
(2) The effective refractive index of TEi in the waveguide WG1 continuously changes (e.g., continuously decreases or increases) in the direction from the input end toward the output end.
(3) The effective refractive index of TEi in the waveguide WG2 continuously changes (e.g., continuously increases or decreases) in the direction from the input end toward the output end.
(4) The quantitative relation at the input end between the effective refractive index of TEi in the waveguide WG1 and the effective refractive index of TEj in the waveguide WG2 is opposite to the quantitative relation at the output end between the effective refractive index of TEi in the waveguide WG1 and the effective refractive index of TEj in the waveguide WG2. That is, when the effective refractive index of TEi in the waveguide WG1 at the input end is higher than the effective refractive index of TEj in the waveguide WG2 at the input end, the effective refractive index of TEi in the waveguide WG1 at the output end is lower than the effective refractive index of TEj in the waveguide WG2 at the output end. When the effective refractive index of TEi in the waveguide WG1 at the input end is lower than the effective refractive index of TEj in the waveguide WG2 at the input end, the effective refractive index of TEi in the waveguide WG1 at the output end is higher than the effective refractive index of TEj in the waveguide WG2 at the output end.

When the requirement (2) is satisfied, the effective refractive index of TEj in the waveguide WG2 may be constant throughout the section between the input end and the output end. Similarly, when the requirement (3) is satisfied, the effective refractive index of TEi in the waveguide WG1 may be constant throughout the section between the input end and the output end.

Patent document 2 (Japanese Patent No. 5697778) also discloses the configuration in which a slab is provided between a pair of cores. However, the waveguide device disclosed in patent document 2 does not include a slab formed outward of the pair of cores. In particular, a slab (corresponding to the slab 23 depicted in FIG. 6B) is not formed on a side wall portion of the waveguide through which TE1, which is confined in the core more weakly than TE0, is propagated. Hence, the influence of light scattering caused by roughness of the side walls of the core that is made during manufacturing would be large. Accordingly, the waveguide WG2 through which TE1 is propagated preferably includes slabs on both sides of the rib, as depicted in FIG. 6B.

Variations

Figure 14:
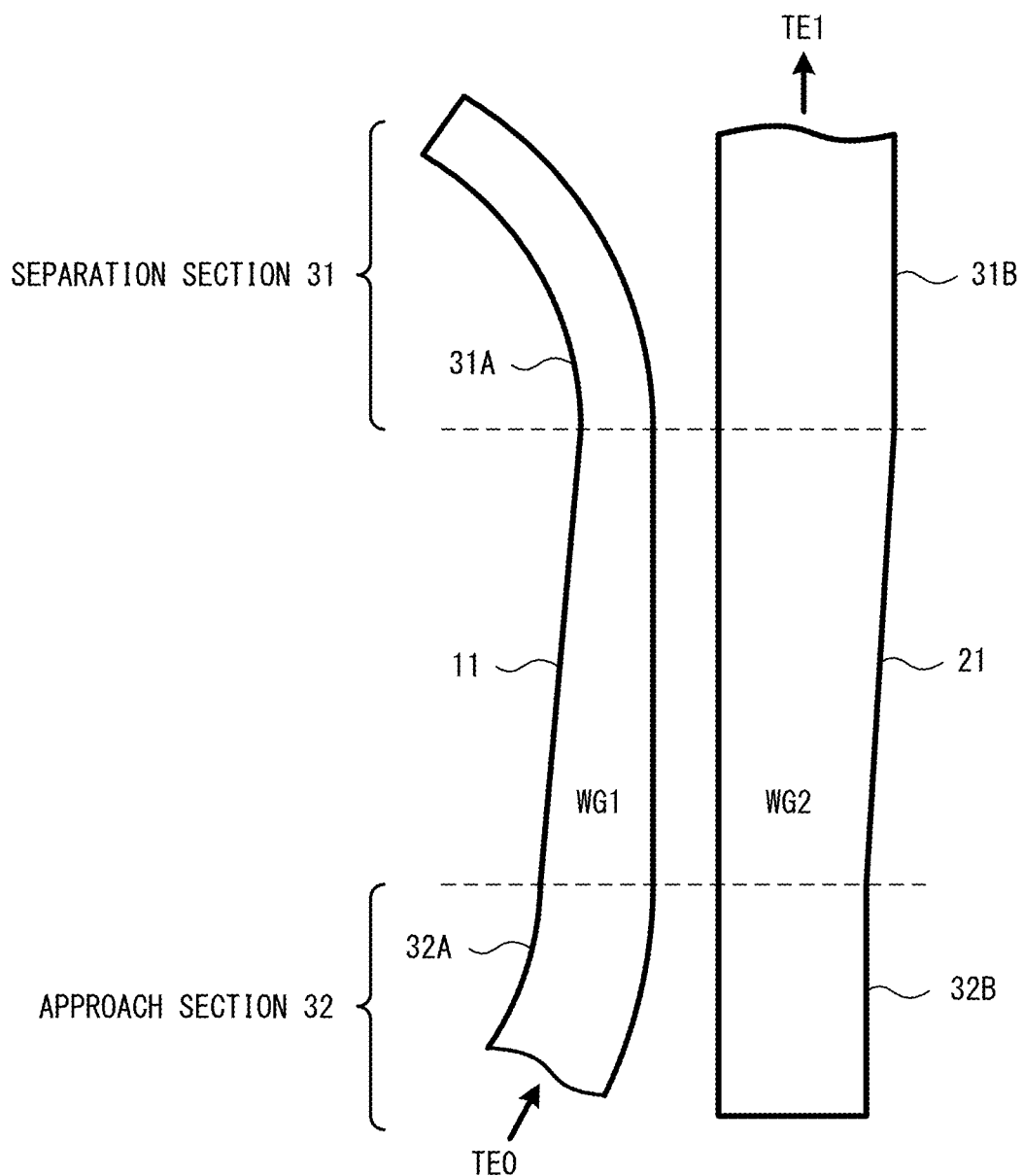
FIG. 14 illustrates a first variation of embodiments of the present invention.

FIG. 14 illustrates a first variation of embodiments of the present invention. In the first variation, the optical waveguide device 1 includes a separation section 31 and an approach section 32. Note that slabs are omitted in FIG. 14 for visibility.

The separation section 31 is provided on the output side of the waveguides WG1 and WG2 and includes waveguides 31A and 31B. The waveguide 31A is coupled to the waveguide WG1. The waveguide 31B is coupled to the waveguide WG2. The spacing between the waveguides 31A and 31B gradually becomes larger as the distance from the output ends of the waveguides WG1 and WG2 increases. In this example, the waveguide 31A is a curved waveguide, and the waveguide 31B is a linear waveguide. The curved waveguide is shaped like an arc, an S bend, or a relaxation curve such as a clothoid curve.

In the configuration described above, light output from the waveguide WG1 is reflected at the leading end of the waveguide 31A. In this case, noise may be generated. However, the leading end of the waveguide 31A is distant from the waveguide 31B though which TM1-mode light propagates. Hence, the influence of the noise on the M1-mode light output from the optical waveguide device 1 is reduced.

The approach section 32 is provided on the input side of the waveguides WG1 and WG2 and includes waveguides 32A and 32B. The waveguide 32A is coupled to the waveguide WG1. The waveguide 32B is coupled to the waveguide WG2. The spacing between the waveguides 32A and 32B gradually becomes larger as the distance from the input ends of the waveguides WG1 and WG2 increases. In this example, the waveguide 32A is a curved waveguide, and the waveguide 32B is a linear waveguide.

As a general rule, TE0 is more strongly confined in a waveguide than TE1. In this example, TE0-mode light propagates through the waveguide 32A, the waveguide WG1, and the waveguide 31A. The electric field components of light are more easily leaked from a curved waveguide than from a linear waveguide. Thus, in order to suppress leakage of electric fields, light that propagates through a curved waveguide is preferably TE0-mode light, rather than TE1-mode light. Accordingly, in this example, the waveguides 32A and 31A, through which TE0-mode light propagates, are formed from curved waveguides, and the waveguides 32B and 31B, through which TE1-mode light propagates, are formed from linear waveguides.

However, the first variation is not limited to this configuration. For example, the optical waveguide device 1 may include either of the separation section 31 and the approach section 32. Both of the waveguides 31A and 31B may be curved waveguides, and/or both of the waveguides 32A and 32B may be curved waveguides.

Figure 15A:
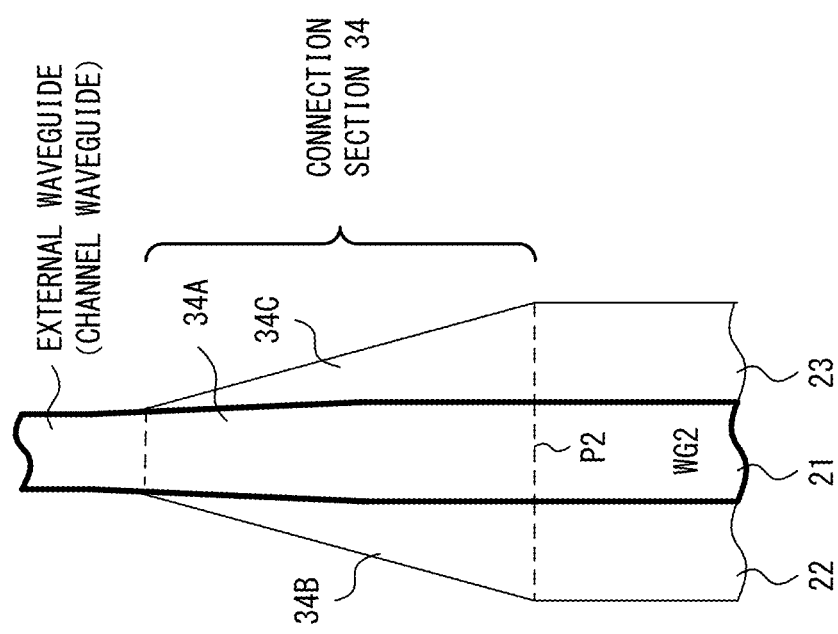
FIGS. 15A and 15B illustrate a second variation of embodiments of the present invention.
Figure 15B:
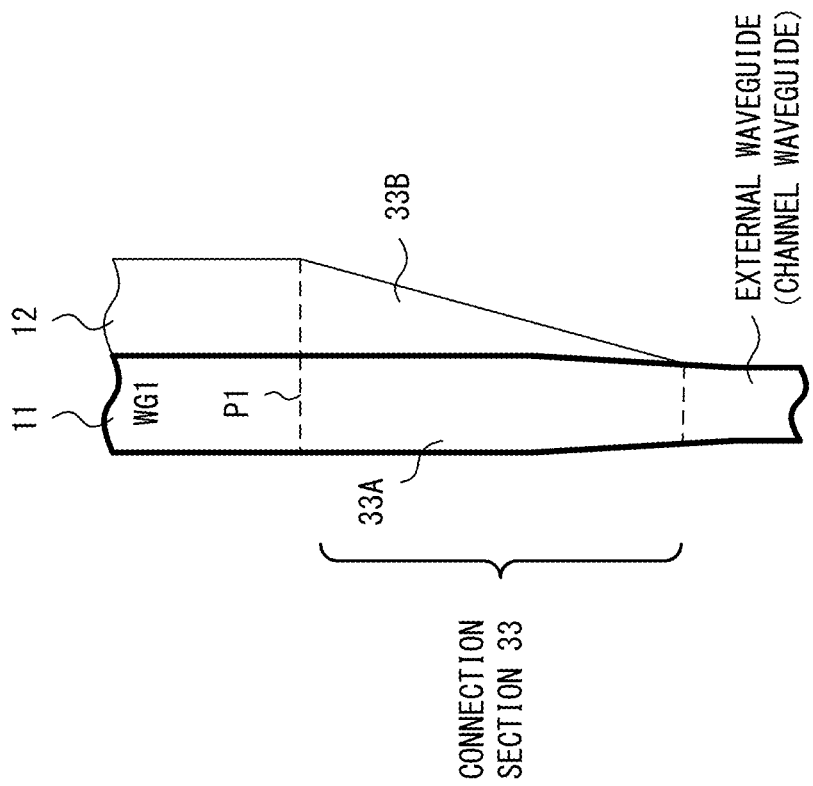

FIGS. 15A and 15B illustrate a second variation of embodiments of the present invention. In the second variation, the optical waveguide device 1 includes a connection section located between the optical waveguide device 1 and an external waveguide. The external waveguide is a channel waveguide having a cross section shaped like a rectangle.

As depicted in FIG. 15A, a connection section 33 is provided between the external waveguide and the port P1 of the waveguide WG1. The connection section 33 includes a rib 33A and a slab 33B. One of the ends of the rib 33A is coupled to the rib 11 of the waveguide WG1, and the other end of the rib 33A is coupled to the external waveguide. The slab 33B is coupled to the slab 12 of the waveguide WG1. In this example, the width of the external waveguide is smaller than the width of the rib 11 at the input end of the waveguide WG1. Thus, the width of the rib 33A gradually increases in the direction from an end of the external waveguide toward the port P1. Meanwhile, the external waveguide does not include a slab. Thus, the width of the slab 33B gradually increases in the direction from the end of the external waveguide toward the port P1. Accordingly, the widths of the rib 33A and the slab 33B continuously change in a tapered manner in the direction in which light propagates.

As depicted in FIG. 15B, a connection section 34 is provided between the port P2 of the waveguide WG2 and an external waveguide. The connection section 34 includes a rib 34A, a slab 34B, and a slab 34C. One of the ends of the rib 34A is coupled to the rib 21 of the waveguide WG2, and the other end of the rib 34A is coupled to the external waveguide. The slabs 34B and 34C are respectively coupled to the slabs 22 and 23 of the waveguide WG2. In this example, the width of the external waveguide is smaller than the width of the rib 21 at the output end of the waveguide WG2. Thus, the width of the rib 34A gradually decreases in the direction from the port P2 toward the end of the external waveguide. Meanwhile, the external waveguide does not include a slab. Thus, the widths of the slabs 34B and 34C gradually decrease in the direction from the port P2 toward an end of the external waveguide. Accordingly, the widths of the rib 34A and the slabs 34B and 34C continuously change in a tapered manner in the direction in which light propagates.

Many external waveguides are formed from channel waveguides, which provide strong confinement of light, so as to cause light to propagate to a desired element or circuit on an optical substrate. The width of a channel waveguide may be different from the width of the waveguide at the input or output end of the optical waveguide device 1. In this case, the connection section 33 and/or the connection section 34 may be provided such that the waveguide does not have a discontinuous point. As a result, a loss caused by, for example, reflection at a point of connection between the external waveguide and the optical waveguide device 1 is suppressed.

Figure 16B:
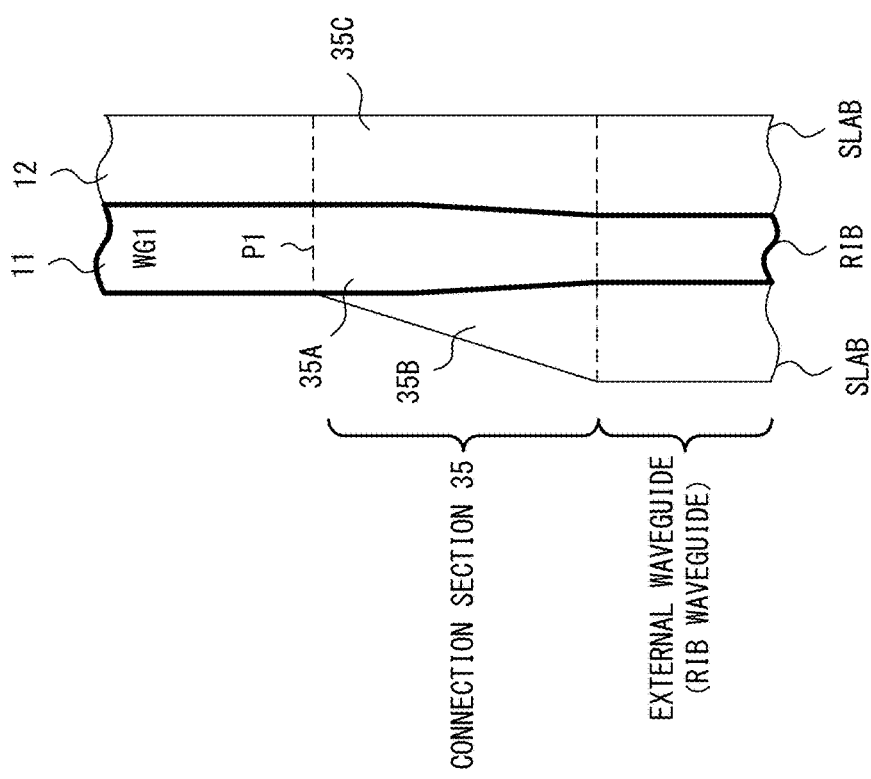
FIGS. 16A and 16B illustrate a third variation of embodiments of the present invention.
Figure 16A:
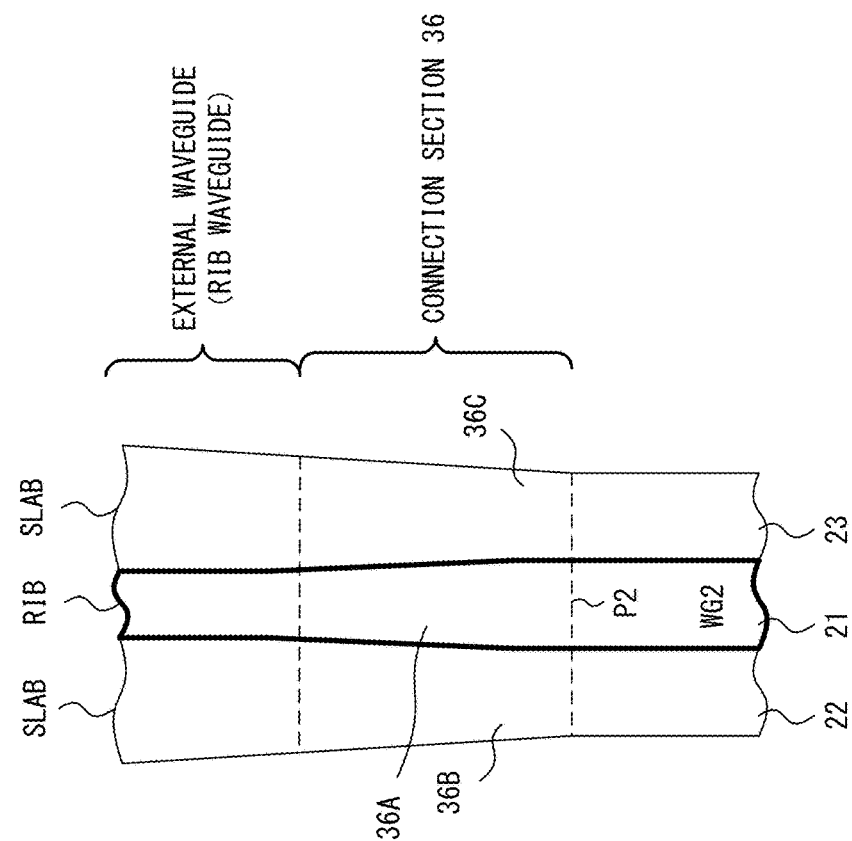

FIGS. 16A and 16B illustrate a third variation of embodiments of the present invention. In the third variation, the optical waveguide device 1 includes, as in the second variation, a connection section located between the optical waveguide device 1 and an external waveguide. However, in the third variation, the external waveguide is a rib waveguide. The rib waveguide has a small propagation loss caused by roughness of the side surfaces of the waveguide.

As depicted in FIG. 16A, a connection section 35 is provided between the external waveguide and the port P1 of the waveguide WG1. The connection section 35 includes a rib 35A, a slab 35B, and a slab 35C. The rib 35A is coupled to the rib 11 of the waveguide WG1 and the rib of the external waveguide. The slab 35B is coupled to a slab of the external waveguide. The slab 35C is coupled to the slab 12 of the waveguide WG1 and a slab of the external waveguide.

As depicted in FIG. 16B, a connection section 36 is provided between the port P2 of the waveguide WG2 and an external waveguide. The connection section 36 includes a rib 36A, a slab 36B, and a slab 36C. The rib 36A is coupled to the rib 21 of the waveguide WG2 and the rib of the external waveguide. The slab 36B is coupled to the slab 22 of the waveguide WG2 and a slab of the external waveguide. The slab 36C is coupled to the slab 23 of the waveguide WG2 and a slab of the external waveguide.

The width of the rib of the connection section 35 (36) gradually changes such that the difference between the width of the rib of the waveguide WG1 (WG2) and the width of the rib of a corresponding external waveguide is adjusted. The width of the slabs of the connection section 35 (36) gradually changes such that the difference between the width of the slab(s) of the waveguide WG1 (WG2) and the width of the slabs of a corresponding external waveguide is adjusted. In this case, the connection section 35 and/or the connection section 36 may be provided such that the waveguide does not have a discontinuous point. As a result, a loss caused by, for example, reflection at a point of connection between the external waveguide and the optical waveguide device 1 is suppressed.

Figure 17:
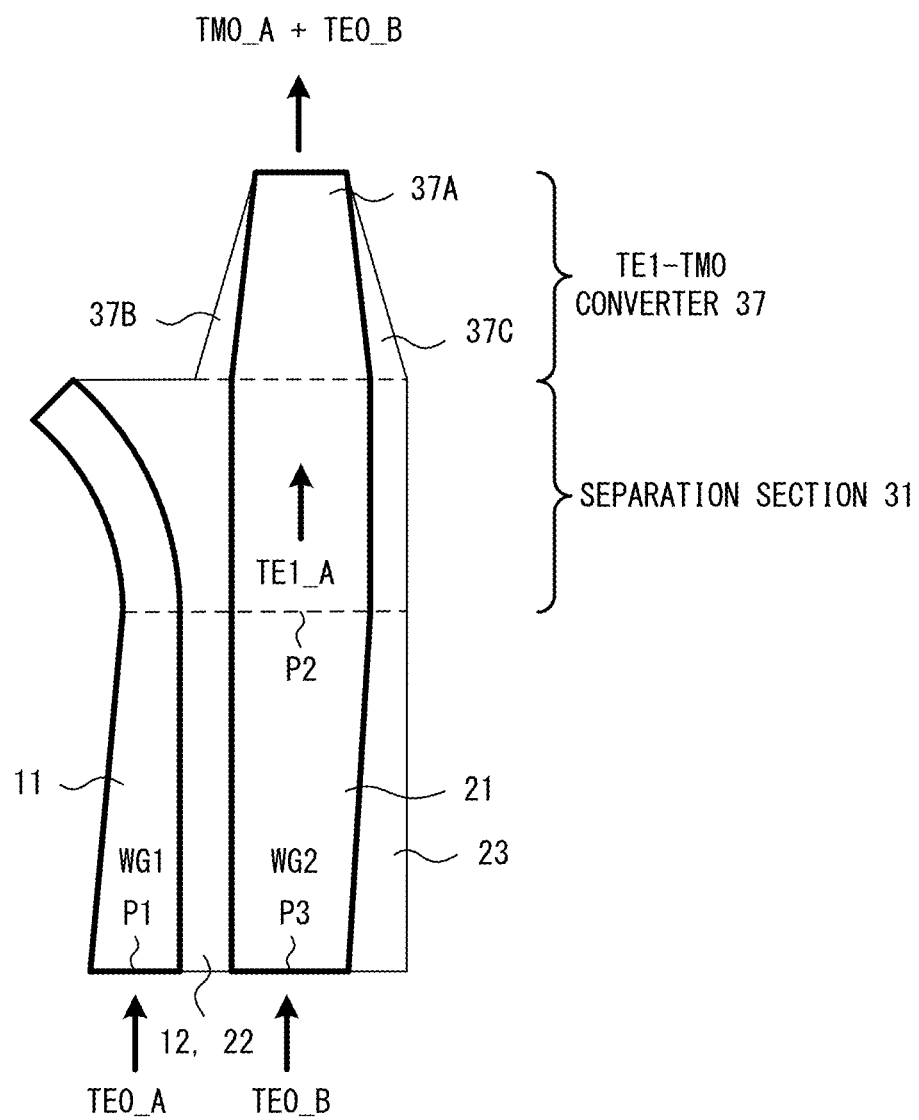
FIG. 17 illustrates a fourth variation of embodiments of the present invention.

FIG. 17 illustrates a fourth variation of embodiments of the present invention. In the fourth variation, the optical waveguide device 1 includes a TE1-TM0 converter 37 and performs mode conversion between TE0 and TM0.

The TE1-TM0 converter 37 is optically coupled to the output end of the waveguide WG2 (i.e., port P2). In this example, the separation section 31 depicted in FIG. 14 is provided between the port P2 and the TE1-TM0 converter 37.

The TE1-TM0 converter 37 is a rib waveguide and includes a rib 37A, a slab 37B, and a slab 37C. The rib 37A is coupled to the rib 21 of the waveguide WG2 via the rib of the waveguide 31B in the separation section 31. The slabs 37B and 37C are respectively coupled to the slabs 22 and 23 of the waveguide WG2 via the slabs of the waveguide 31B in the separation section 31.

In this example, the TE1-TM0 converter 37 is formed from a rib waveguide. Hence, the distribution of the refractive index in the waveguide is vertically asymmetric. That is, the distribution of the refractive index in the waveguide is not symmetric with respect to an axis parallel to the substrate. The rib waveguide has a tapered shape. Furthermore, in the TE1-TM0 converter 37, the effective refractive index of TE1 and the effective refractive index of TM0 have a cross point. With this configuration, the mode conversion between TE1 and TM0 is implemented. Such a TE1-TM0 converter is described in, for example, Japanese Patent No. 5728140. In the example depicted in FIG. 17, the channel waveguide is coupled to the output side of the TE1-TM0 converter 37. However, a rib waveguide may be coupled to the output side of the TE1-TM0 converter 37.

In the optical waveguide device 1, when TE0-mode light is input to the port P1 of the waveguide WG1, TE1-mode light will be generated in the waveguides WG1 and WG2. The TE1-mode light is output through the port P2 and guided to the TE1-TM0 converter 37. The TE1-TM0 converter 37 performs the mode conversion between TE1 and TM0. Thus, the configuration depicted in FIG. 17 implements polarization conversion between TE0 and TM0.

TE0-mode light input to the port P3 of the waveguide WG2 (TE0_B) propagates through the waveguide WG2. In this case, the TE0-mode light will be output through the port P2 without being subjected to mode conversion, as described above by referring to FIGS. 11A, 11B, 12, and 13. Thus, inputting TE0-mode light through the port P1 (TE0_A) and inputting TE0-mode light through the port P3 (TE0_B) will lead to polarization multiplexing of TE0 and TM0.

In addition, the waveguide WG2 can have, at the port P2, a refractive index distribution symmetric in the width direction. For example, when the rib 21 has a rectangular cross section, forming slabs 22 and 23 having the same shape on both sides of the rib 21 will allow for attainment of a refractive index distribution symmetric in the width direction. In this regard, when the TE1-TM0 converter has a refractive index distribution symmetric in the width direction, the conversion from TE1 to TE0 does not easily occur.

Hence, the configuration depicted in FIG. 17 will provide a high polarization extinction ratio.

FIGS. 18A-18D illustrate a fifth variation of embodiments of the present invention. In the fifth variation, the optical waveguide device 1 includes an optical terminator 41 for removing or suppressing unnecessary light.

In the optical waveguide device 1, when TE0-mode light is input through the port P1, TM1-mode light will be output from the port P2. However, some of the input light components are output through the output end of the waveguide WG1 (i.e., through the port P4) as residual components. In this regard, if the optical terminator 41 is not provided, such residual components will be reflected by an end of the waveguide 31A and return to the waveguide WG1. The returning residual components will affect the characteristics of the optical waveguide device 1.

Figure 18A:
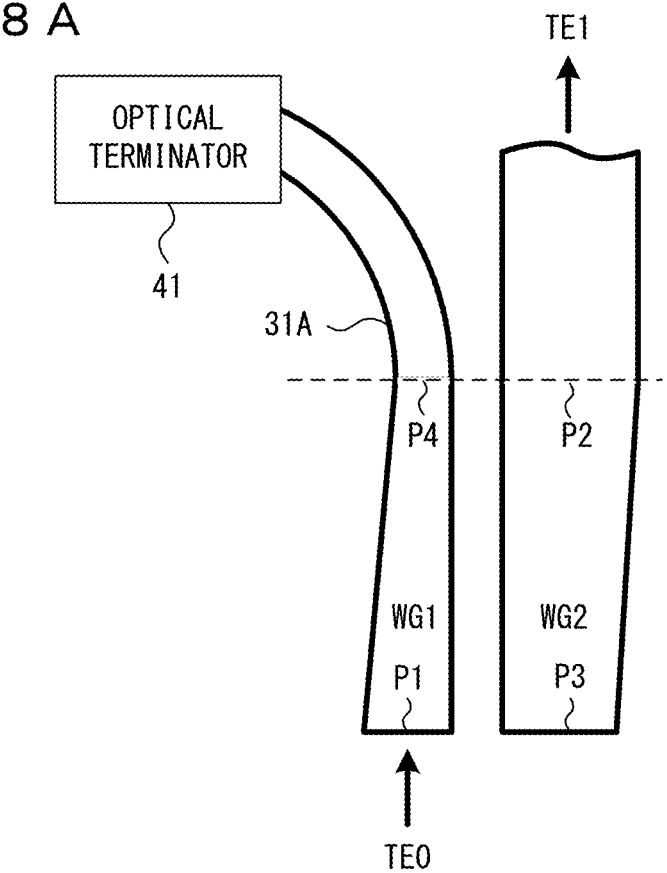
FIGS. 18A-18D illustrate a fifth variation of embodiments of the present invention.

Accordingly, as depicted in FIG. 18A, the optical waveguide device 1 may include the optical terminator 41 at the leading end of the waveguide 31A. In this configuration, residual components output through the port P4 are terminated by the optical terminator 41, thereby suppressing reflection. Thus, providing the optical terminator 41 improves the characteristics of the optical waveguide device 1. When light is not input through the port P3, an optical terminator is also preferably provided at the port P3.

Figure 18B:
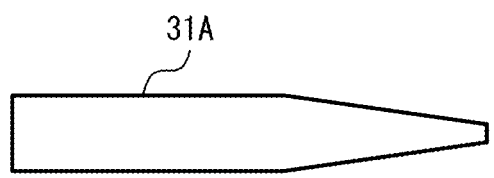
Figure 18C:
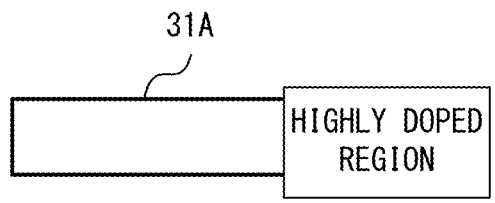
Figure 18D:
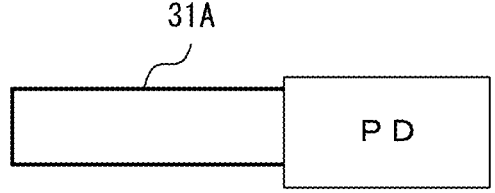

For example, the optical terminator 41 may be implemented by making the leading end of the waveguide 31A have a tapered structure, as depicted in FIG. 18B. In this case, the core of the waveguide 31A is formed to have a width that gradually decreases. The optical terminator 41 may also be implemented by highly doping the portion of the waveguide 31A close to the leading end with a light-absorptive material, as depicted in FIG. 18C. For example, the core of the waveguide 31A may be doped with a light-absorptive material. The light-absorptive material is not particularly limited and may be a publicly known material. Alternatively, the optical terminator 41 may be implemented by providing a photodetector such as a photodiode at the leading end of the waveguide 31A, as depicted in FIG. 18D. In this case, light arriving at the leading end of the waveguide 31A is converted into a current, thereby suppressing reflection.

In the embodiments described above, the cores are formed from Si, and the claddings are formed from SiO2. However, the present invention is not limited to this configuration. For example, both the cores and the claddings may be PLCs formed from SiO2. The waveguides WG1 and WG2 may be InP waveguides or GaAs waveguides. Alternatively, the waveguides may include a core formed from Si or SiN, a lower cladding formed from SiO2, and an upper cladding implemented by SiO2 or air.

Note that, a Si waveguide has a large difference in refractive index between a core and a cladding and attains strong confinement of light, and thus has a small loss even in the case of a pattern with a small radius of curvature. Hence, in a case where a downsized optical circuit is required, using a Si waveguide may be preferable.

In the examples described above, the cross-sectional area of a core is adjusted by changing the width of the core. However, the cross-sectional area of a core may be adjusted by changing the height of the core or by changing both the width and height of the core. However, when the core of a waveguide is formed by lithography and etching, the width of the core is determined by the shape of a mask. Thus, a method that adjusts the cross-sectional area of a core by changing the width of the core will be a preferable method for preventing the fabrication process from being complicated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical waveguide device that includes a first waveguide and a second waveguide formed parallel to each other, wherein
   the first waveguide includes a first rib and a first slab, the first slab being formed on a side of the first rib facing the second waveguide, no slab being formed on an other side of the first rib,
   the second waveguide includes a second rib, a second slab and a third slab, the second rib being provided between the second slab and the third slab,
   the first slab and the second slab are integrally formed in a region between the first rib and the second rib,
   a shape of a cross section of at least one of the first rib and the second rib continuously changes in a region between an input end and an output end of the optical waveguide device,
   at one end of the optical waveguide device, a first effective refractive index that indicates an effective refractive index of a TEi mode in the first waveguide is different from a second effective refractive index that indicates an effective refractive index of a TEj mode in the second waveguide, where i and j are integers that are different from each other and larger than or equal to zero, and
   when the first effective refractive index is higher than the second effective refractive index at the one end of the optical waveguide device, the first effective refractive index is lower than the second effective refractive index at another end of the optical waveguide device.

2. The optical waveguide device according to claim 1, wherein
   a width of the first rib continuously decreases in a tapered manner in a direction from the input end to the output end of the optical waveguide device, and a width of the second rib continuously increases in a tapered manner in the direction from the input end to the output end of the optical waveguide device.

3. The optical waveguide device according to claim 1, wherein
   at the input end of the optical waveguide device, a first effective refractive index indicating an effective refractive index of a TE0 mode in the first waveguide is higher than a second effective refractive index indicating an effective refractive index of a TE1 mode in the second waveguide, and
   at the output end of the optical waveguide device, the first effective refractive index is lower than the second effective refractive index.

4. The optical waveguide device according to claim 1, further comprising:
   a separation section that includes a third waveguide coupled to an output end of the first waveguide and a fourth waveguide coupled to an output end of the second waveguide, wherein
   a spacing between the third waveguide and the fourth waveguide becomes larger as a distance from the output ends of the first waveguide and the second waveguide increases.

5. The optical waveguide device according to claim 1, further comprising:
   an approach section that includes a third waveguide coupled to an input end of the first waveguide and a fourth waveguide coupled to an input end of the second waveguide, wherein
   a spacing between the third waveguide and the fourth waveguide becomes larger as a distance from the input ends of the first waveguide and the second waveguide increases.

6. The optical waveguide device according to claim 1, further comprising:
   a connection section that includes a third optical waveguide coupled to an input end of the first waveguide, wherein
   the third optical waveguide includes a first connection rib coupled to the first rib and a first connection slab coupled to the first slab, and
   a width of at least one the first connection rib and the first connection slab continuously changes in a tapered manner in a direction in which light propagates.

7. The optical waveguide device according to claim 1, further comprising:
   a connection section that includes a third optical waveguide coupled to an output end of the second waveguide, wherein
   the third optical waveguide includes a second connection rib coupled to the second rib, a second connection slab coupled to the second slab, and a third connection slab coupled to the third slab, and
   a width of at least one of the second connection rib, the second connection slab, and the third connection slab continuously changes in a tapered manner in a direction in which light propagates.

8. The optical waveguide device according to claim 1, wherein
   the TEi is TE0,
   the TEj is TE1, and
   the optical waveguide device further comprises a mode converter that is located on an output side of the second waveguide and performs conversion between TE1 and TM0.

9. The optical waveguide device according to claim 1, further comprising:
   an optical terminator that is provided at least at an output end of the first waveguide and an input end of the second waveguide.

* * * * *